US010885754B2

(12) United States Patent
O'Brien et al.

(10) Patent No.: US 10,885,754 B2
(45) Date of Patent: *Jan. 5, 2021

(54) OCCUPANCY-SENSOR WIRELESS-SECURITY AND LIGHTING CONTROL

(71) Applicant: OWL Enterprises, LLC, Issaquah, WA (US)

(72) Inventors: Michael O'Brien, Bellevue, WA (US); Rocco Terry, Sammamish, WA (US); Donald Small, Oakland, CA (US)

(73) Assignee: OWL ENTERPRISES, LLC, Issaquah, WA (US)

( * ) Notice: Subject to any disclaimer, the term of this patent is extended or adjusted under 35 U.S.C. 154(b) by 365 days.

This patent is subject to a terminal disclaimer.

(21) Appl. No.: 15/927,893

(22) Filed: Mar. 21, 2018

(65) Prior Publication Data
US 2018/0286198 A1     Oct. 4, 2018

Related U.S. Application Data

(63) Continuation-in-part of application No. 15/620,729, filed on Jun. 12, 2017, now Pat. No. 10,460,580, (Continued)

(51) Int. Cl.
*G08B 13/19*     (2006.01)
*G08B 25/10*     (2006.01)
(Continued)

(52) U.S. Cl.
CPC .............. *G08B 13/19* (2013.01); *G08B 25/10* (2013.01); *H05B 47/105* (2020.01); *H05B 47/19* (2020.01);
(Continued)

(58) Field of Classification Search
CPC ...... G08B 13/19; G08B 25/10; Y10T 307/766
See application file for complete search history.

(56) References Cited

U.S. PATENT DOCUMENTS 7,880,393 B2      2/2011  Wong et al.
9,704,360 B2 *    7/2017  O'Brien ................. G08B 13/19
(Continued)

OTHER PUBLICATIONS

Office Action dated Aug. 23, 2016 for U.S. Appl. No. 14/211,293, 21 pages.
(Continued)

*Primary Examiner* — Jeffrey M Shin
(74) *Attorney, Agent, or Firm* — Amin, Turocy & Watson, LLP

(57) ABSTRACT

Integrating a direct current (DC) voltage motion sensing alarm with an alternating current (AC) voltage light source is presented herein. A wall switch box can comprise a voltage conversion component that generates a DC voltage from an AC voltage that is higher in magnitude than the DC voltage, a motion sensing component detects a motion of an object using the DC voltage, and a security component that generates, based on the motion using the DC voltage, an alarm signal that has been encoded according to an encryption strength of a communication protocol corresponding to a transmission of the alarm signal from the wall switch box. In one aspect, a communication expansion component can wirelessly transmit, using the DC voltage based on control information specifying the communication protocol, the alarm signal according to the encryption strength. In another aspect, the encryption strength can correspond to at least $2^{128}$ combinations.

20 Claims, 19 Drawing Sheets

Related U.S. Application Data which is a continuation of application No. 14/211,293, filed on Mar. 14, 2014, now Pat. No. 9,704,360.

(60) Provisional application No. 61/799,285, filed on Mar. 15, 2013.

(51) Int. Cl.
*H05B 47/19* (2020.01)
*H05B 47/105* (2020.01)
*G08B 13/196* (2006.01)
*G08B 13/16* (2006.01)

(52) U.S. Cl.
CPC .... *G08B 13/1645* (2013.01); *G08B 13/19619* (2013.01); *G08B 13/19697* (2013.01)

(56) References Cited

U.S. PATENT DOCUMENTS

| | | |
|---|---|---|
| 10,460,580 B2 * | 10/2019 | O'Brien ................ G08B 13/19 |
| 2003/0016129 A1 | 1/2003 | Menard et al. |
| 2006/0000971 A1 | 1/2006 | Jones et al. |
| 2008/0303661 A1 | 12/2008 | Chick |

OTHER PUBLICATIONS

Office Action dated May 21, 2019 for U.S. Appl. No. 15/620,729, 19 pages.

\* cited by examiner

OCCUPANCY-SENSOR WIRELESS-SECURITY AND LIGHTING CONTROL

PRIORITY CLAIM

This patent application is a continuation-in-part of, and claims priority to, U.S. patent application Ser. No. 15/620,729 (now U.S. Pat. No. 10,460,580, issued Oct. 29, 2019), filed on Jun. 12, 2017, entitled "OCCPANCY-SENSOR WIRELESS-SECURITY AND LIGHTING-CONTROL", which is a continuation of, and claims priority to each of, U.S. patent application Ser. No. 14/211,293, filed on Mar. 14, 2014, entitled "OCCPANCY-SENSOR WIRELESS-SECURITY AND LIGHTING-CONTROL" (now U.S. Pat. No. 9,704,360, issued Jul. 11, 2017), which claims priority to U.S. Provisional Patent Application No. 61/799,285, filed on Mar. 15, 2013, entitled "OCCUPANCY SENSOR/WIRELESS ALARM UNIT." The entireties of the aforementioned patent applications are incorporated by reference herein.

BACKGROUND

Lighting-control systems utilize sensors placed in buildings for energy management. Further, security systems utilize other sensors placed in buildings for motion detection. However, conventional light control and motion sensing technologies have had some drawbacks that will be appreciated with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
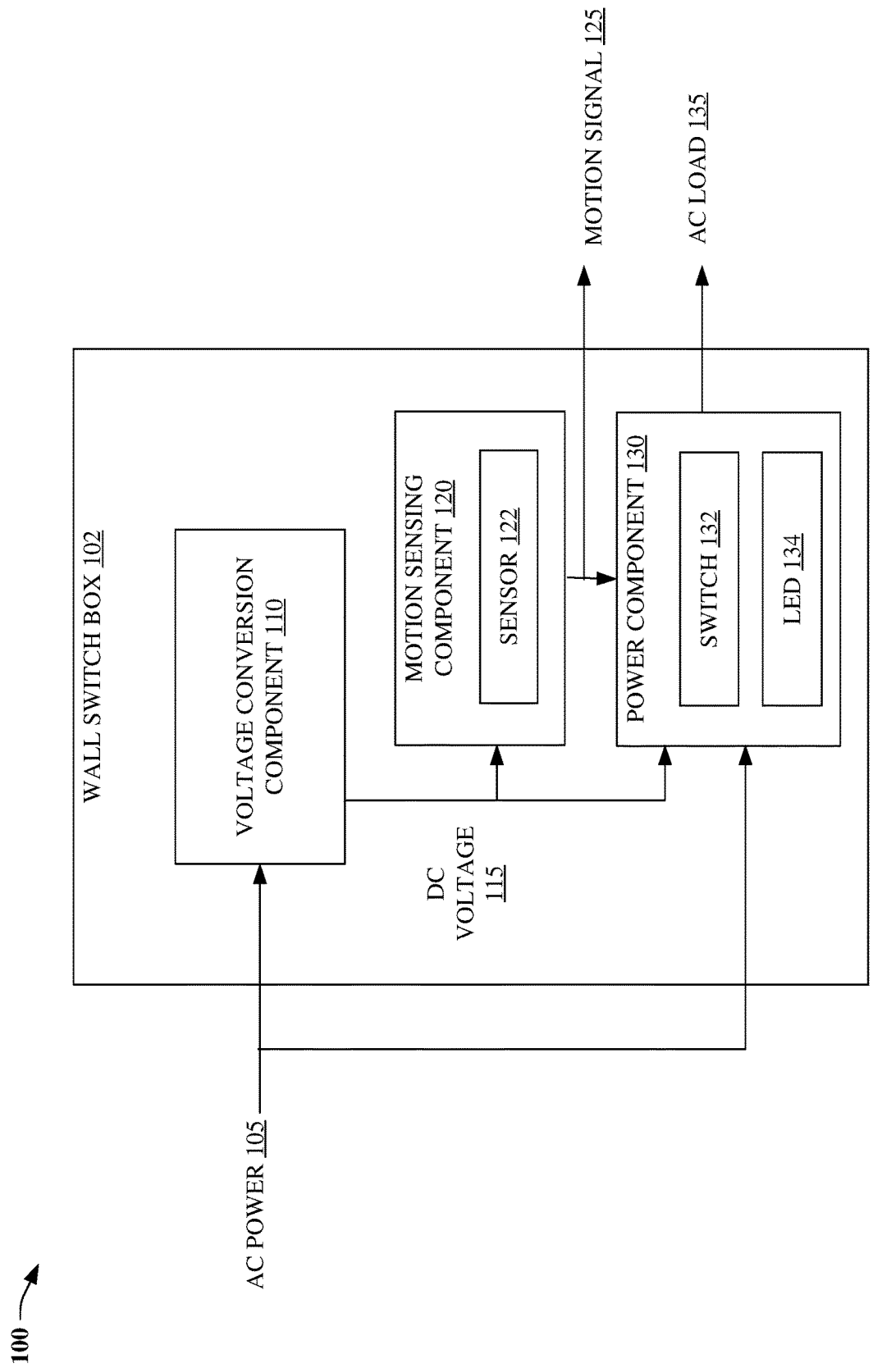
FIG. 1 illustrates a block diagram of a wall switch box, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Government energy codes, e.g., the International Energy Conservation Code (IECC), etc. establish minimum building design requirements to save energy, e.g., specifying that motion sensors can be used to control lighting, e.g., shut lights off when no motion is detected in a room of a building, etc. Such sensors are distinct from other sensors of a security system installed in the building, e.g., used to detect unauthorized occupants of the building during non-business hours.

Various embodiments disclosed herein can eliminate the redundancy of mounting separate sensors in a building to meet security and energy efficiency needs by integrating a low voltage motion sensing alarm with a high voltage light source—within a form factor conforming to industry standard construction junction boxes. For example, such embodiments can be housed in a small enclosure designed to fit in a standard size wall junction box that would normally contain a manual toggle light switch or motion controlled light switch. Further, such embodiments enable easy installation in new construction, as well as retrofit in existing construction, to provide energy efficiency, convenience, and security controls in a single, cost effective, small form factor device.

For example, an apparatus, e.g., a wall switch box (e.g., a single-gang electrical box, a wall junction box), etc. can comprise a voltage conversion component that generates, within the wall switch box, a direct current (DC) voltage, e.g., 12 volts DC (VDC), from an alternating current (AC) voltage that is higher in magnitude than the DC voltage, e.g., 85 to 305 volts AC (VAC). Further, the wall switch box can comprise a motion sensing component that detects, from the wall switch box using the DC voltage, a motion of an object, e.g., using a passive infrared (IR) based DC sensor and/or an ultrasonic based DC sensor installed in the wall switch box; and a security component that generates, based on the motion using the DC voltage, an alarm signal that has been encoded according to an encryption strength (e.g., corresponding to at least $2^{24}$ combinations, corresponding to at least $2^{128}$ combinations, etc.) of/associated with a communication protocol (e.g., Z-Wave, ZigBee, Thread, WeMo, Bluetooth, Bluetooth Mesh, WiFi, a 433 MHz frequency band, a 900 MHz frequency band, a 2.4 GHz frequency band, a binary key that has been manually programmed via a user interface of the apparatus, etc.) corresponding to a transmission of the alarm signal from the wall switch box.

In an embodiment, the wall switch box can comprise a communication expansion component that wirelessly transmits, using the DC voltage based on control information specifying the communication protocol, the alarm signal according to the encryption strength. For example, communication expansion component can wirelessly transmit the alarm signal to an annunciation panel, a control panel, an alarm interface, a smarthub based home, building, etc. automation/control device, an application of a mobile device, a cellular phone, etc. In turn, the annunciation panel, etc. can be configured to play, record, etc. sound and/or video corresponding to a detected motion using the data, e.g., for remote monitoring of a location, building, etc. of the wall switch box.

In another embodiment, the wall switch box can comprise a power component that switches, from the wall switch box using the DC voltage based on the motion, the AC voltage from a first contact to a second contact, e.g., which is electrically coupled to a light fixture. In yet another embodiment, the power component can switch the AC voltage from the first contact to the second contact based on a detected contact of a switch, mechanical switch, touch sensor, etc. that is electrically coupled to the DC voltage, e.g., to override, prevent, etc. power component from powering a light fixture when a motion has been detected by the motion sensing component. In an embodiment, the motion sensing component can detect the motion using an infrared sensor and/or an ultrasonic based sensor.

In embodiment(s), the wall switch box can comprise a video camera, a microphone, etc. that generates, using the DC voltage, data based on the motion; and the communication expansion component can wirelessly transmit, using the DC voltage according to the encryption strength, the data from the wall switch box to, e.g., the annunciation panel, the control panel, the alarm interface, the smarthub based home, building, etc. automation/control device, the application of the mobile device, the cellular phone, etc.

In other embodiment(s), the wall switch box further comprises an application programming interface (API) integration component that receives, via a smarthub based interface, control information from a requesting device/interface, e.g., the annunciation panel, the control panel, the alarm interface, the smarthub based home, etc. automation/control device, the application of the mobile device, the cellular phone, etc. Further, based on the control information, the API integration component can: send, to the requesting device/interface, a distinct identifier (ID) representing the wall switch box; arm or disarm the alarm signal; record audio, video, environmental, etc. information that has been generated by the wall switch box; control a notification corresponding to the alarm signal that has been directed to an alarm service device; and/or control a device, e.g., light, appliance, etc. within the location, building, etc. of the wall switch box.

In an embodiment, a wall switch device can comprise a switch that is electrically coupled to a DC voltage, e.g., 12 VDC, and that activates, using the DC voltage based on a detected contact of the switch, a relay within the wall switch device—the relay switching an AC voltage, e.g., 85 to 305 VAC, from a first contact to a second contact, e.g., to power a light fixture. In this regard, the DC voltage has been generated by the AC voltage within the wall switch device, and a first magnitude of the AC voltage is greater than a second magnitude of the DC voltage.

Further, the wall switch device comprises: an opening corresponding to a portion of a motion sensing component that detects, from the wall switch device using the DC voltage, the motion of the object; a security component that generates, based on the motion using the DC voltage, an alarm signal; and an encoder component that encodes, using the DC voltage, the alarm signal based on an encryption corresponding to, associated with, etc. a communication protocol used to wirelessly communicate the alarm signal to a remote device, e.g., the annunciation panel, etc.; the requesting device/interface, etc.

In an embodiment, the communication protocol is, corresponds to, etc. Z-Wave, ZigBee, Thread, WeMo, Bluetooth, Bluetooth Mesh, WiFi, a 433 MHz frequency band, a 900 MHz frequency band, or a 2.4 GHz frequency band. In another embodiment, the encoder component encodes the alarm signal via an interface of the wall switch device based on a defined binary key, e.g., associated with a communication protocol corresponding to the 433 MHz frequency band.

Another embodiment can comprise an apparatus, e.g., an alarm system, an annunciation panel, etc. comprising a voltage conversion component that generates a DC voltage from an AC voltage that is higher in magnitude than the DC voltage. Further, the apparatus can comprise an alarm component that wirelessly receives, via a defined communication protocol using the DC voltage, an alarm signal from a motion sensing component of a wall switch box based on a motion that has been detected by the motion sensing component. Further, the alarm component can generate an alarm output representing the alarm signal in response to a determination that the alarm signal has been encoded according to an encryption that corresponds to/is associated with the defined communication protocol.

In yet another embodiment, the apparatus can comprise a wireless transceiver that wirelessly transmits, via the defined communication protocol using the DC voltage, data based on the alarm output. In an embodiment, the defined communication protocol comprises Z-Wave, ZigBee, Thread, WeMo, Bluetooth, Bluetooth Mesh, WiFi, a 433 MHz frequency band, a 900 MHz frequency band, or a 2.4 GHz frequency band.

Referring now to FIG. 1, a block diagram 100 of wall switch box 102, e.g., a single-gang electrical box, a wall junction box, etc. is illustrated, in accordance with various embodiments. Wall switch box 102 can include voltage conversion component 110, motion sensing component 120, and power component 130. As illustrated, voltage conversion component 110 can receive AC power 105, e.g., via electrical wiring installed within, at, etc. wall switch box 102. In an embodiment, AC power 105 includes voltages from 85 to 305 VAC. Voltage conversion component can generate DC voltage 115, e.g., 12 VDC, within wall switch box 102 from AC power 105, e.g., an AC voltage that is higher in magnitude than the DC voltage.

Motion sensing component 120 can detect, from wall switch box 102 using DC voltage 115, a motion of an object, person, pet, etc., e.g., within a sensing range, area, etc. of wall switch box 102. In this regard, motion sensing component 120 can detect the motion of the object using sensor 122, e.g., an infrared based DC motion sensor, an ultrasonic based DC motion sensor, etc. that is installed in wall switch box 102, and generate motion signal 125 in response to the detected motion.

Power component 130 can receive AC power 105, and switch, from wall switch box 102 using DC voltage 115 based on motion signal 125, AC power 105 from a first contact to a second contact, e.g., electrically coupled to AC load 135, e.g., a light fixture. In another embodiment, power component 130 can switch AC power 105 from the first contact to the second contact based on a detected contact of switch 132, e.g., a mechanical switch, touch sensor, etc. that is electrically connected, coupled, etc. to DC voltage 115, e.g., to override, prevent, etc. powering of the light fixture when a motion has been detected by motion sensing component 120. Further, light emitting diode (LED) 134, can emit, based on motion signal 125 using the DC voltage, light.

Figure 2:
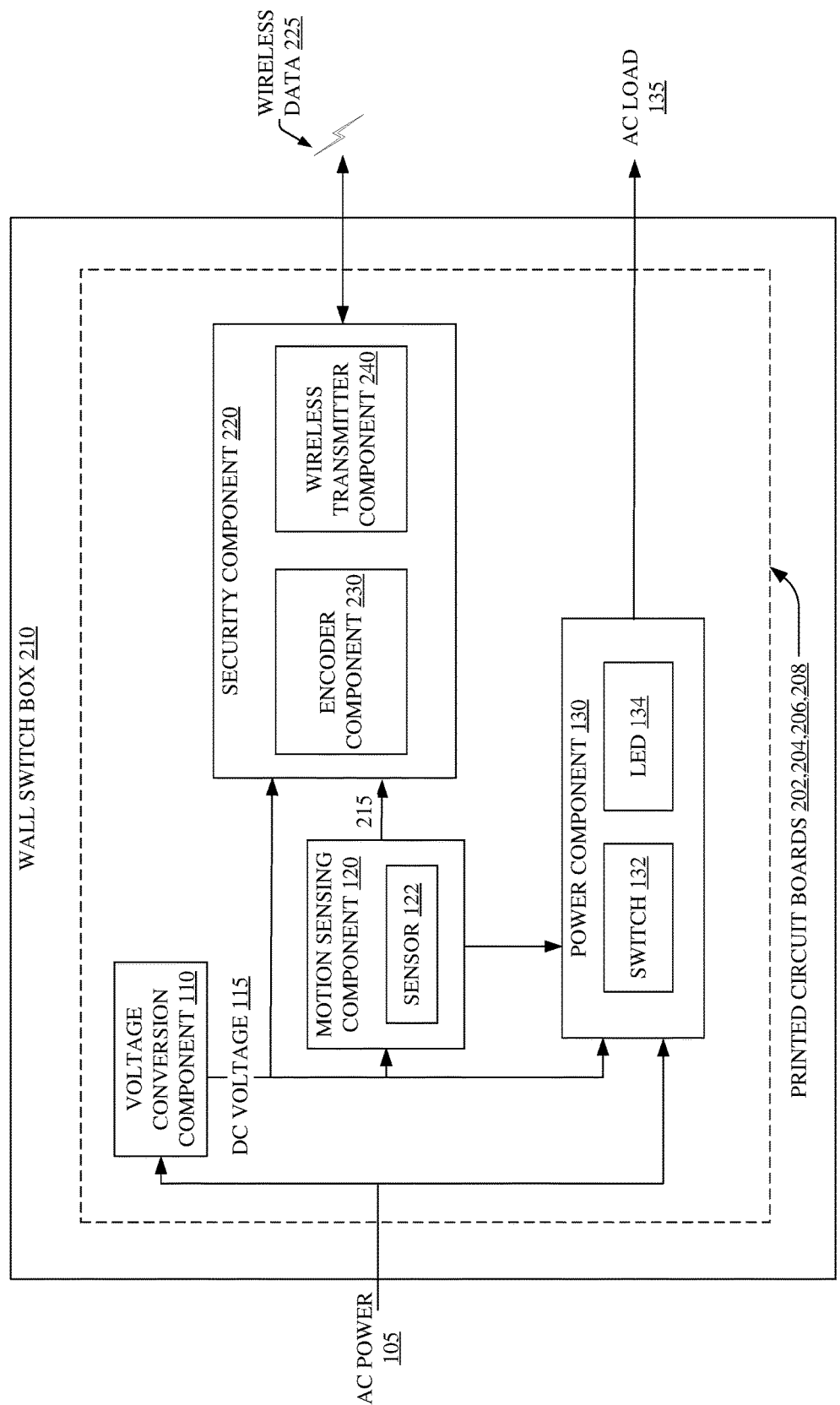
FIG. 2 illustrates another block diagram of a wall switch box, in accordance with various example embodiments.

In an embodiment illustrated by FIG. 2, wall switch box 210 can further include security component 220 that generates, from wall switch box 210 using DC voltage 115, an alarm signal (215) based on motion signal 125, e.g., representing motion signal 125. In another embodiment, security component 220 can include encoder component 230 that encodes, using DC voltage 115, the alarm signal, e.g., based on a selected, defined, etc. communication protocol, e.g., based on a defined binary key that can be manually set, programmed, etc. for security purposes via a pushbutton setup switch (not shown), e.g., representing 1 of $2^{24}$ possible key words. Security component 220 can further include wireless transmitter component 240 that can wirelessly transmit, using DC voltage 115 based on the alarm signal, wireless data 225 from wall switch box 210, e.g., directed to an annunciation panel, an alarm system (see, e.g., 1000, 1500 described below), a control panel, an alarm interface (see e.g. alarm component 820 described below), etc.

Figure 3:
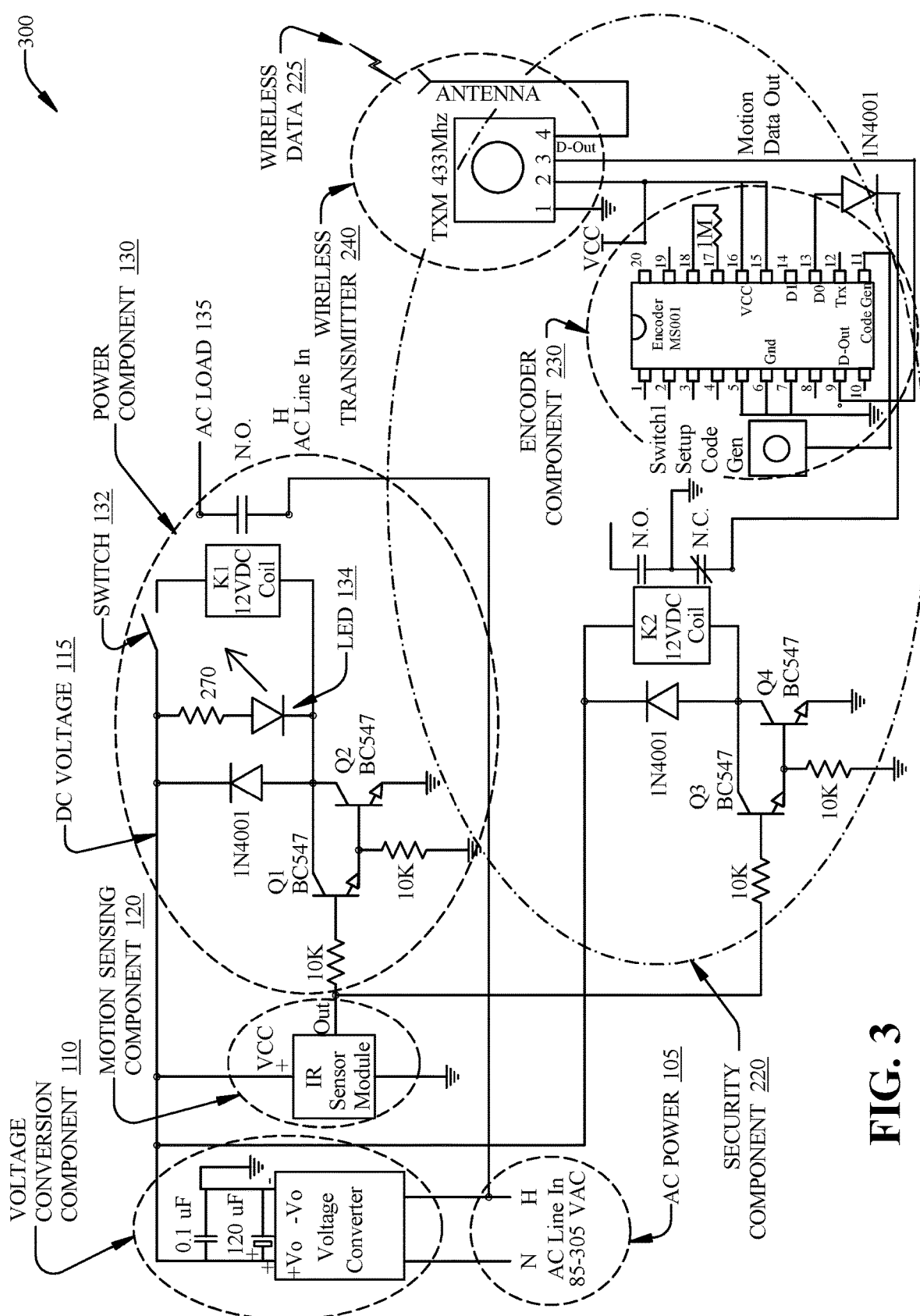
FIG. 3 illustrates an electronic schematic of a wall switch box, in accordance with various example embodiments.

Referring now to FIG. 3, an electronic schematic 300 of wall switch box 210 is illustrated, in accordance with various embodiments. As illustrated by FIG. 3, voltage conversion component 110 can comprise an auto-switching voltage converter that automatically senses and converts voltages of AC Power 105—within a range of 85 to 305 VAC—to 12 VDC. In one or more embodiments, the auto-switching voltage converter meets one or more of the following specifications: 30 milliwatts (mW) max of no-load power consumption; high power conversion efficiency, e.g., up to 80%; isolated 3 kilo VAC output protection for 1 minute; short circuit protection; overvoltage protection: EN55022 and FCC Class B specifications: built-in fusible resistor. In this regard, voltage conversion component 110 can generate DC voltage 115 while sourcing only a very small portion of power from AC power 105, e.g., maintaining a larger portion of power from AC power 105 to be switched, as described below, to lighting fixtures or other high-voltage powered devices.

Further, as illustrated by FIG. 3, motion sensing component 120 can comprise a sensor module, e.g., sensor 122, which can comprise a passive IR based DC motion sensor, an ultrasonic based DC motion sensor, a temperature sensor, etc. An output of the sensor module, e.g., motion signal 125, goes high, e.g., 12 VDC, when sensor 122 detects a motion. In one or more embodiments, sensor 122 can be adjusted for range detection, e.g., from 3 meters to 7 meters, and a duration of time that the output of the sensor module remains activated by the detected motion can be adjusted, e.g., from 5 seconds to 5 minutes.

In response to the output of the sensor module going high, Darlington transistor pair Q1/Q2 of power component 130 and Darlington transistor pair Q3/Q4 of security component 220 are activated. In this regard, amplified current of Darlington transistor pair Q1/Q2 activates LED 134 and a 12 VDC coil of lighting relay K1, which attaches AC Load 135, e.g., electronically connected to a light fixture, to an AC input feed voltage, e.g., AC Power 105. However, switch 132, e.g., a light override switch, can disable activation of lighting relay K1—enabling the light fixture to be manually switched off without affecting alarm functions corresponding to security component 220.

Regardless of the position of switch 132, amplified current of Darlington transistor pair Q3/Q4 activates a 12 VDC coil of isolation relay K2, which attaches to an input of encoder component 230, e.g., a data pin "D0" of an MS001 encoder chip, e.g., manufactured by Linx Technologies™. In this regard, the input of the data pin goes high, activating generation and wireless encoding of an alarm signal, data, etc. that is output from "D-OUT" of the MS001 encoder chip.

The MS001 encoder chip is addressable with $2^{24}$ combinations via "Switch 1", a code generator mode pushbutton setup switch attached to the MS001 encoder chip. The addressing feature allows uniquely identified wireless radio frequency (RF) signals to be configured for multiple zones, and for avoidance of conflicts with signals from other sources in nearby locations on a common carrier frequency. In this regard, the output of the MS001 encoder chip is broadcast via wireless transmitter component 240, e.g., comprising a 433 megahertz (MHz) transmitter module, as wireless data 225. In an embodiment, the 433 MHz transmitter is rated up to 900 meters of transmission distance depending on physical and RF signal interference.

Figure 4:
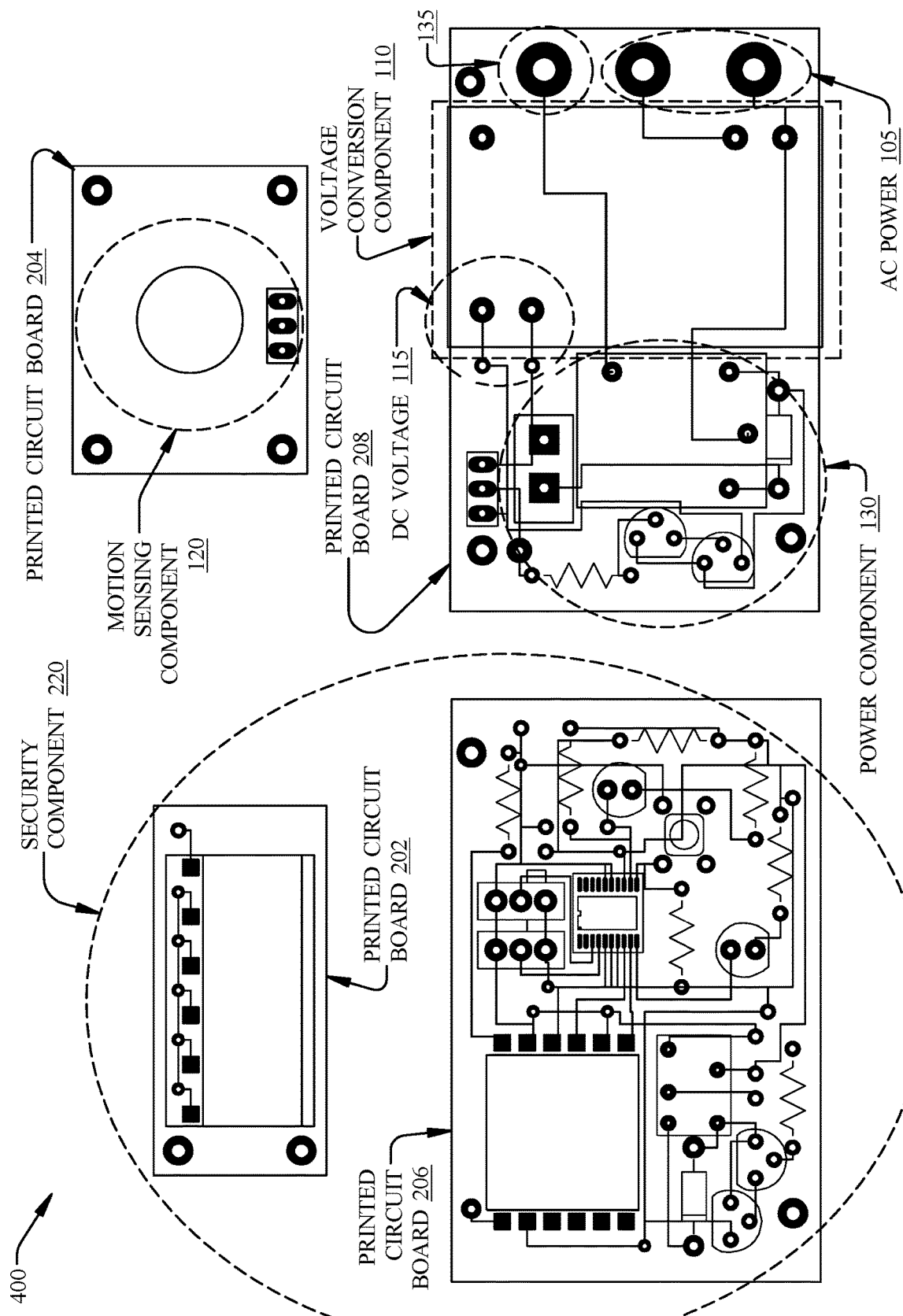
FIG. 4 illustrates printed circuit boards placed within a wall switch box, in accordance with various example embodiments.

In an embodiment illustrated by FIG. 4, printed circuit boards (PCBs) (202, 204, 206, and 208) comprise a multi-layer printed circuit board (PCB) configuration comprising respective components, circuit elements, devices, etc. of wall switch box 210, wall switch box 710, etc. In this regard, in embodiment(s), the multi-layer PCB configuration separates device electronics into power and functional categories, and fits within industry standard construction wall junction boxes while isolating high-voltage AC circuits and switching components from low-voltage DC electronics.

As illustrated by FIG. 4, PCB 202, e.g., an antenna board, can comprise a compact, surface mount antenna array that provides long distance transmission without further external antenna requirements, and can be positioned within wall switch box 210 to further isolate sensitive antenna array components from power sources and other components generating electronic noise. Further, PCB 202 can be moved forward in the wall junction box to optimize wireless signal transmission via the surface mount antenna array.

PCB 204 can comprise sensor components, e.g., sensor 122, and can be placed forward of the other PCBs for sensing movement from a face of wall switch box 210, e.g., from a facing of casing 502 described below.

PCB 206 can comprise low-voltage components for alarm system encoding, wireless transmission, and configuration. Components and individual component pins on PCB 206 can operate at low voltages ranging from 0.3 VDC to 4.25 VDC, and are isolated from the other PCBs to reduce signal interference from higher voltage circuitry.

PCB 208 can comprise a high-voltage, e.g., 85 to 305 VAC interface power input, power conversion components, and switching relay controls electrically coupled to the sensor and low-voltage components.

Figure 5:
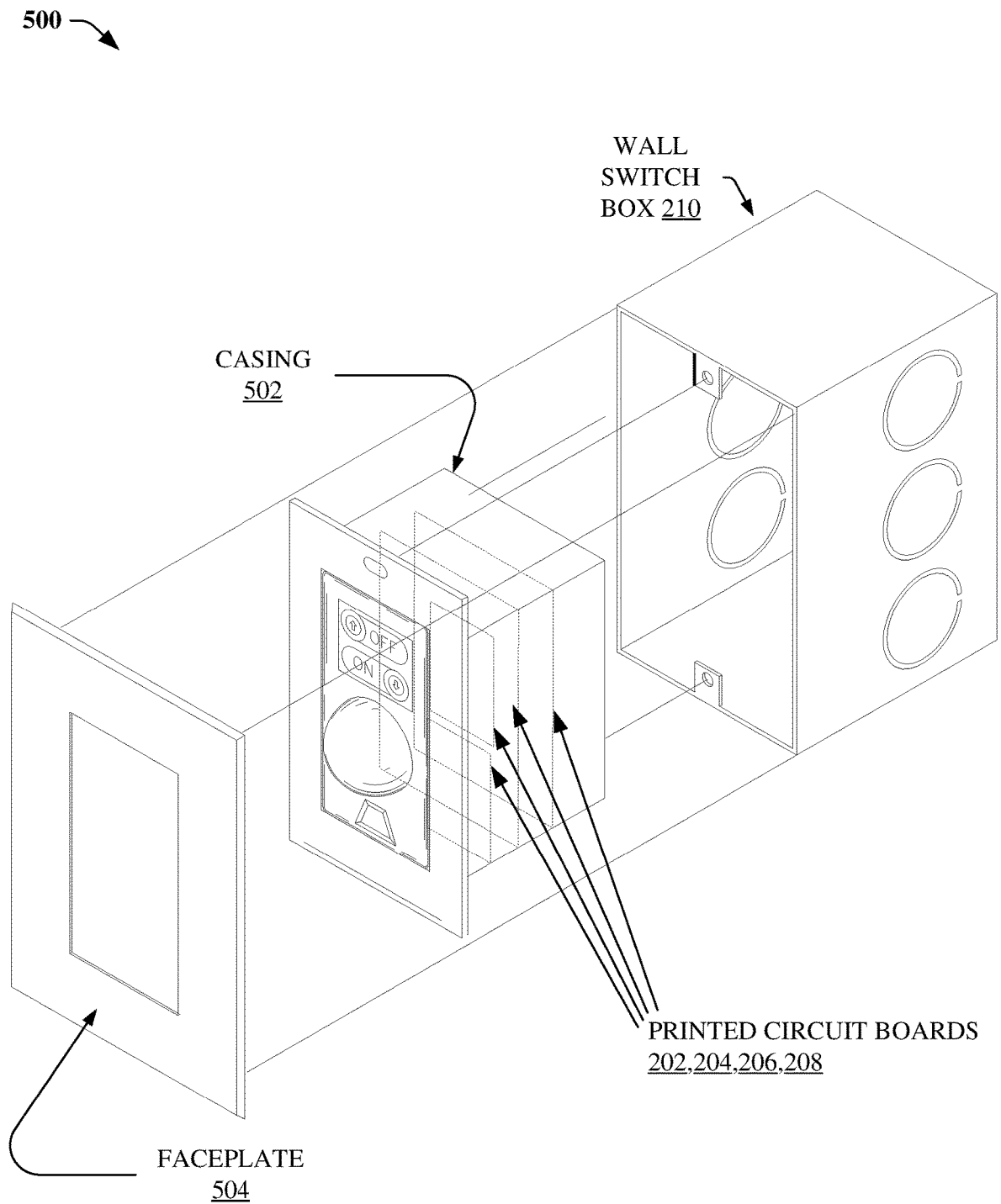
FIG. 5 illustrates yet another block diagram of a wall switch box, in accordance with various example embodiments.

As described above, and in embodiments illustrated by FIGS. 5 and 6, PCB 202, PCB 204, PCB 206, and PCB 208 can be positioned, placed, etc. within casing 502 to fit within wall switch box 210. In this regard, faceplate 504 can be a standard electrical cover plate placed over casing 502 to trim out wall switch box 210. In other embodiments, faceplate 504 can be a decorative face and/or cover plate of multiple colors and shapes that can be used to trim out wall switch box 210.

Figure 6:
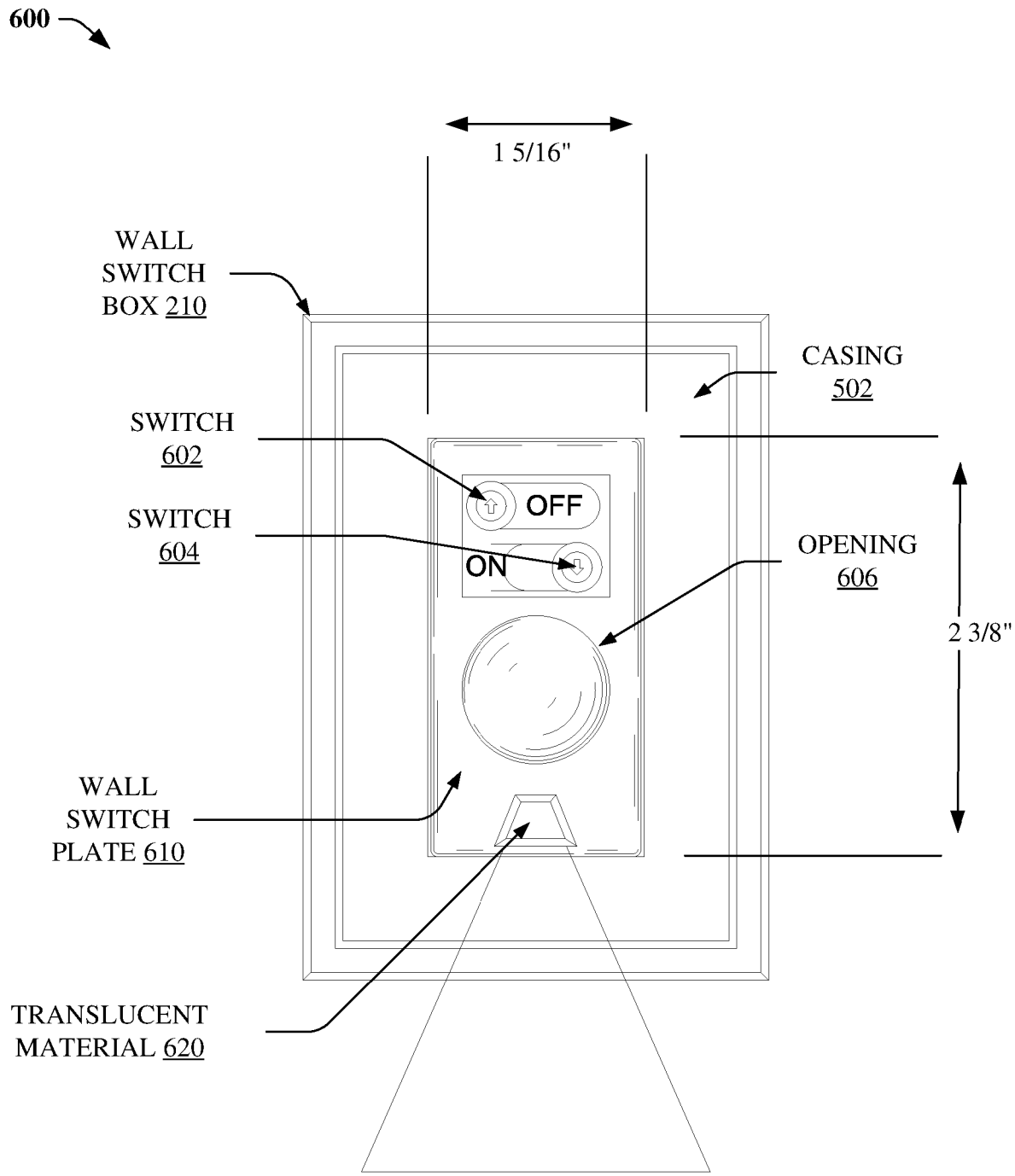
FIG. 6 illustrates a face design of a casing of a wall switch box, in accordance with various example embodiments.

Now referring to FIG. 6, a wall switch plate 610 of casing 502 of wall switch box 210 is illustrated, in accordance with various embodiments. Switch 602, e.g., switch 132, a touch based switch, mechanical sliding switch, mechanical toggle switch, etc. is electrically coupled between 12 VDC and lighting relay K1 of power component 130. In this regard, switch 602 operates as a light override switch that can disable activation of lighting relay K1, thereby removing power from a light fixture (not shown) that is connected to power component 130—without affecting alarm functions corresponding to security component 220.

Switch 604, e.g., a touch based switch, mechanical sliding switch, mechanical toggle switch, etc. electrically couples 12 VDC of power component 130 to a night light, LED, etc. (not shown), that can be powered on/off regardless of motion detected by motion sensing component 120. In one embodiment, wall switch plate 610 can include translucent material 620 covering one or more portions of the night light, etc. Opening 606 corresponds to a portion of sensor 122 of motion sensing component 120, e.g., a passive IR based DC motion sensor, an ultrasonic based DC motion sensor, etc. that senses the motion of objects external to wall switch plate 610.

Figure 7:
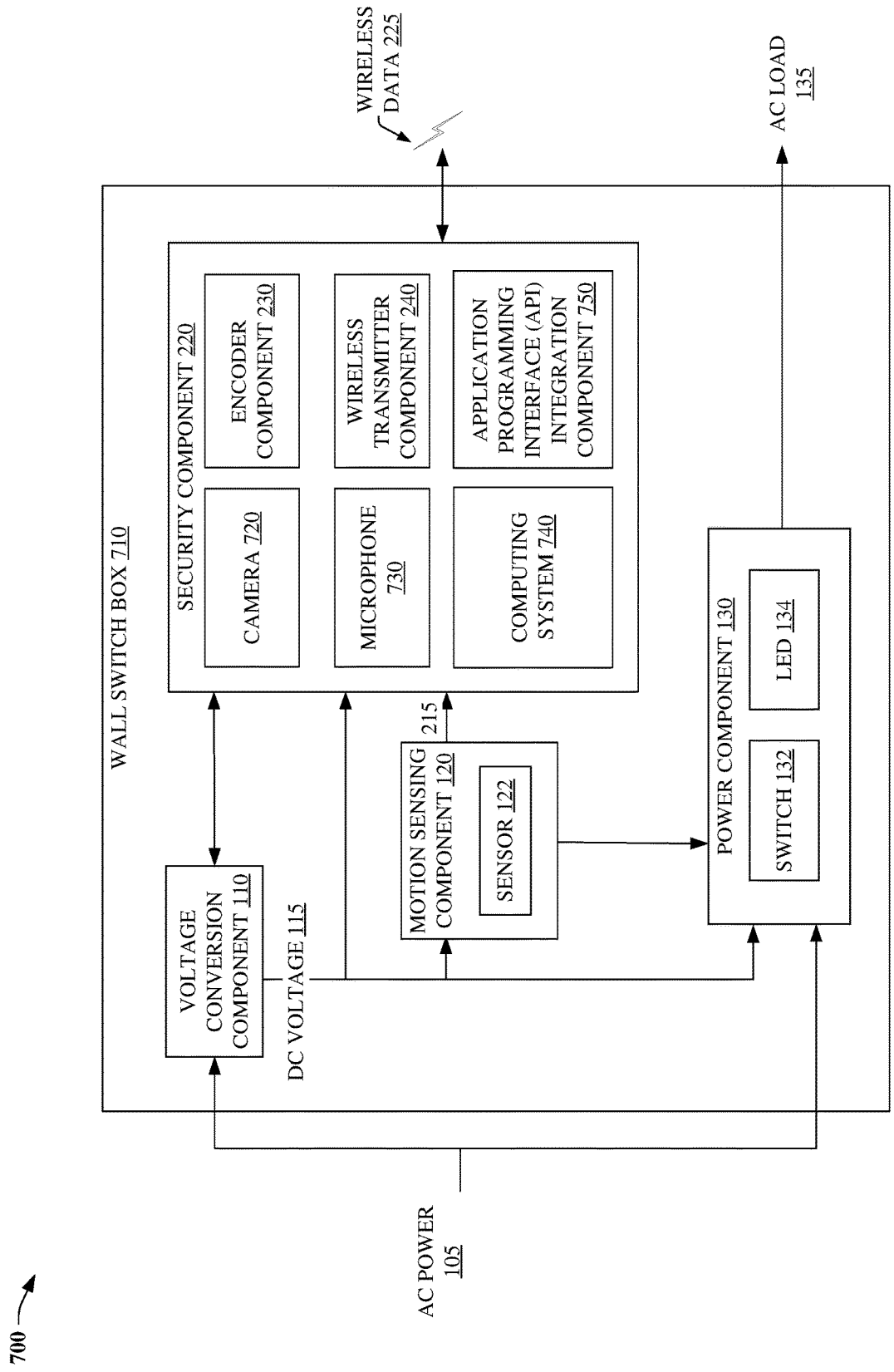
FIG. 7 illustrates a block diagram of a wall switch box including a camera and a microphone, in accordance with various example embodiments.

FIG. 7 illustrates a block diagram of wall switch box 710 including camera 720 and microphone 730, in accordance with various embodiments. Camera 720, e.g., an embedded, DC based video camera, standard wavelength video camera, IR video camera, etc. and microphone 730, e.g., an embedded DC based microphone, etc. can be communicatively coupled to, and configured by, computing system 740, e.g., comprising an embedded microcontroller, microprocessor, computing device, etc. that can be configured to capture, record, etc., via camera 720 and microphone 730, sound, video, images, etc. from wall switch box 710, e.g., in response to detection of a motion by motion sensing component 120, e.g., based on the alarm signal (215). In this regard, computing system 740 can be configured to wirelessly transmit, based on the detected motion utilizing wireless transmitter component 240, wireless data 225 (e.g., comprising audio and/or video information) to an annunciation panel, control panel, alarm interface, smarthub based home, building, etc. automation/control device, etc. Further, the annunciation panel can be configured to play, record, etc. sound and/or video corresponding to the detected motion using the data, e.g., for remote monitoring of the location of wall switch box 710.

Figure 8:
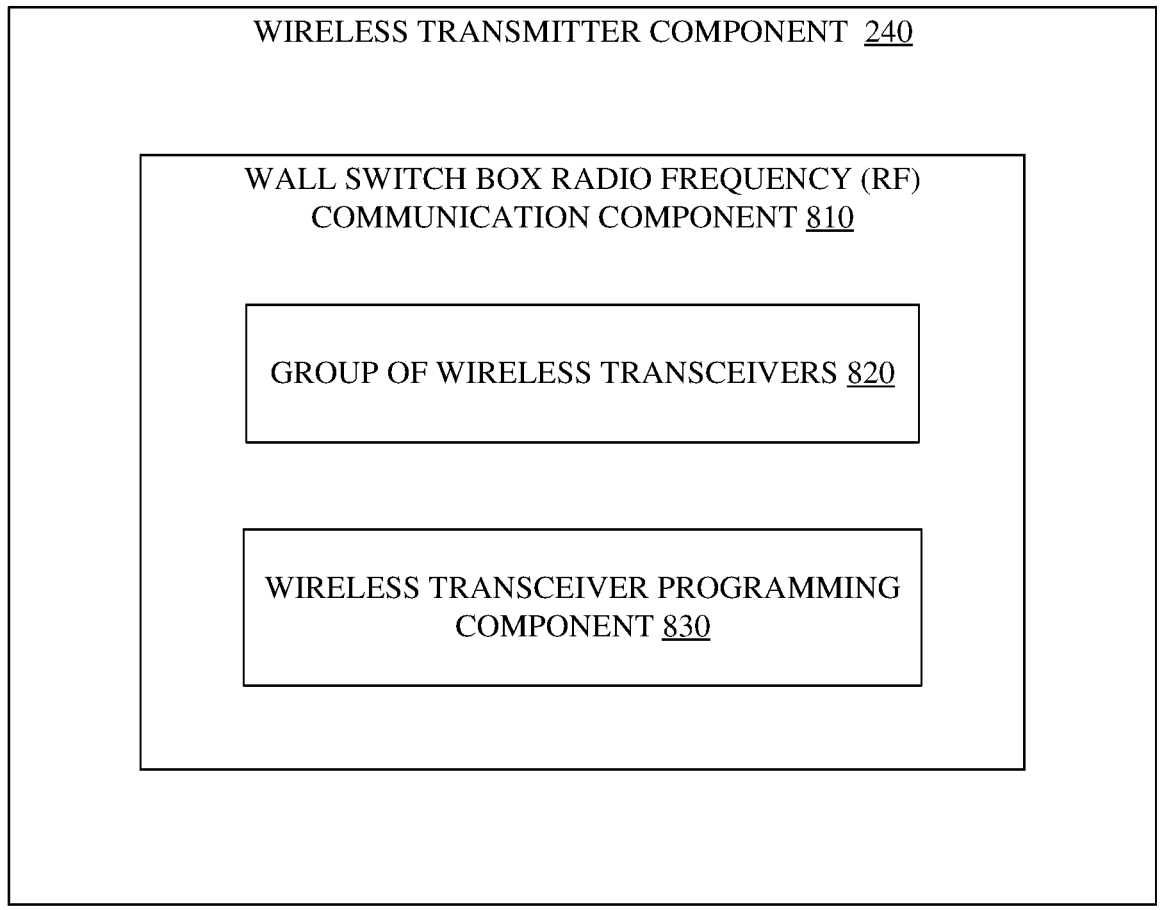
FIG. 8 illustrates a block diagram of a wireless transmitter, in accordance with various example embodiments.

Now referring to FIG. 8, in accordance with various example embodiments (e.g., 210, 710, etc.), wireless transmitter component 240 can comprise communication expansion component 810 to facilitate an expansion of wireless communication between a wall switch box (e.g., 210, 710, etc.) and the annunciation panel, an alarm system (e.g., 1000, 1510), a smarthub based home, building, etc. automation/control device (e.g., Amazon® echo plus, Wink hub 2, Samsung® SmartThings hub, VeraEdge home controller, Securifi Almond 3), an application of a mobile device, cell phone, a web-based application, etc.

Communication expansion component 810 comprises group of wireless transceivers 820 and wireless transceiver programming component 830. Group of wireless transceivers 820 can comprise wireless transceiver(s) (e.g., communication device(s), electronic chip set(s), etc.) (not shown) that can wirelessly communicate, via a computing device (e.g., computing system 740), information (e.g., wireless data 225) between the wall switch box and the annunciation panel, the alarm interface, the smarthub based home, building, etc. automation/control device, the application, the web-based application, etc. using respective communication protocols of the wireless transceiver(s), e.g., Z-Wave, ZigBee, Thread, WeMo, Bluetooth, Bluetooth Mesh, WiFi, based on a 900 MHz band (e.g., 902 MHz to 928 MHz), based on a 2.4 GHz frequency band, etc.

In embodiment(s), wireless transceiver programming component 830 can facilitate, via respective software development kits (SDKs) corresponding to the wireless transceiver(s), programming (e.g., flash memory based programming) of defined capabilities, configurations (e.g., a defined communication protocol), etc. of the wireless transceiver(s), e.g., during a manufacture of wireless transmitter component 240. In turn, communication expansion component 810 can receive, e.g., via wireless data 225, control information for setting up, configuring, controlling, customizing, etc. features of the wireless transceiver(s) based on such programming, e.g., the control information representing a defined communication protocol, wireless transceiver, etc. for a wireless transceiver of group of wireless transceivers 820 to transmit, broadcast, etc. wireless data 225.

For example, in an embodiment, communication expansion component 810 can receive the control information from an application of a client device (not shown) (e.g., a mobile device, a cellular phone, the alarm system, etc.), e.g., via a web-based interface, respective application programming interfaces (APIs) corresponding to the wireless transceiver(s), etc. Further, based on the control information, the computing device can select, configure, etc. the wireless transceiver to transmit, broadcast, etc. wireless data 225.

In this regard, the control information can specify a particular wireless transmitter, transceiver, etc., and corresponding communication protocol, to be used by the wall switch box to transmit, broadcast, etc. the alarm signal to the annunciation panel, the control panel, the alarm interface, the smarthub based home, building, etc. automation/control device, the application, the web-based application, etc. For example, in embodiment(s), the control information can specify that security component 220 select, e.g., via computing system 740: the 433 MHz transmitter to transmit, broadcast, etc. the alarm signal, e.g., which has been encoded via the MS0001 encoder chip; a wireless transceiver of group of wireless transceivers 820 to transmit, broadcast, etc. the alarm signal according to an associated, specified, etc. communication protocol, e.g., Z-Wave, ZigBee, Thread, WeMo, Bluetooth, Bluetooth Mesh, WiFi, based on a 900 MHz band (e.g., 902 MHz to 928 MHz), based on a 2.4 GHz frequency band, etc.

Figure 9:
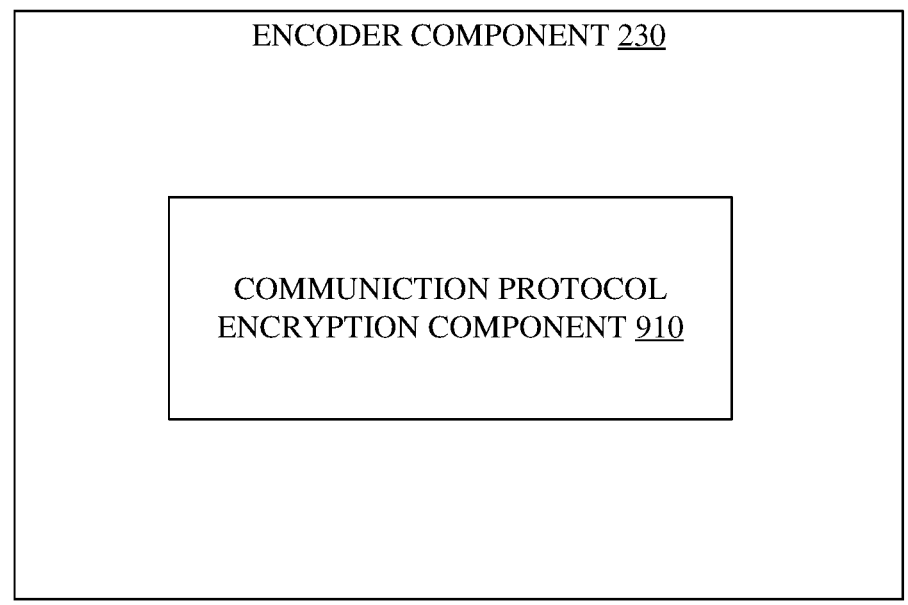
FIG. 9 illustrates a block diagram of an encoder component, in accordance with various example embodiments.

In turn, and now referring to FIG. 9, encoder component 230 can comprise communication protocol encryption component 910 that can encrypt, based on the control information, the alarm signal via the computing device according to the specified, the associated, etc. communication protocol of the wireless transceiver that has been selected based on the control information. In this regard, in embodiment(s), communication protocol encryption component 910 can encrypt the alarm signal based on an encryption strength of at least 128-bits, e.g., as defined, utilized, etc. by a corresponding communication protocol, e.g., Z-Wave, ZigBee, Thread, WeMo, Bluetooth, Bluetooth Mesh, WiFi, etc.

Returning now to FIG. 7, in various example embodiment(s), application programming interface (API) integration component 750 of wall switch box 710 can facilitate the expansion of wireless communication between the wall switch box and the smarthub based home, building, etc. automation/control device(s)—and further facilitate interoperability between the wall switch box and the smarthub based home, building, etc. automation/control device(s)—using respective API(s) corresponding to such device(s). In this regard, the respective API(s) facilitate integration of function(s), capabilit(ies), etc. of the smarthub based home, building, etc. automation/control device(s) with components, features, etc. of the wall switch box 710, e.g., via end user based device(s)/application(s), e.g., a mobile device (e.g., cellular phone) application, a web-based application, etc.

For example, in various embodiment(s), the end user based device(s)/application(s) can perform (e.g., via the smarthub based home, building, etc. automation/control device(s)) various function(s), operation(s), etc. corresponding to wall switch box 710 including, but not limited to: controlling, e.g., via voice control, generation of the alarm signal, e.g., arming the alarm signal, disarming the alarm signal, silencing the alarm signal, canceling a pending alarm signal, etc.; performing audio and/or video recording/monitoring (e.g., via camera 720, microphone 730); monitoring environmental condition(s), e.g., via a temperature sensor (not shown) that has been included in sensor 122; receiving alert(s), notification(s), etc. based on, represented by, etc. the alarm signal; initiating recording, logging, etc. of data (e.g., audio, video, etc.), e.g., via computing system 740, based on the alarm signal; controlling, configuring, etc. notification(s), e.g., directed to an alarm service, company, etc. based on, represented by, the alarm signal; controlling, configuring, etc. text message alert(s), message(s), etc. directed to an end user, e.g., via the mobile device application, the web-based application, etc.; controlling, configuring, etc. device(s), component(s), etc. (e.g., lights, cameras, etc.) of a building, home, etc. corresponding to the smarthub based home, building, etc. automation/control device(s); performing, based on the alarm signal, the notification(s), the test message alert(s), message(s), etc. If This Then That (IFTTT) based service(s), operation(s), etc.

Figure 10:
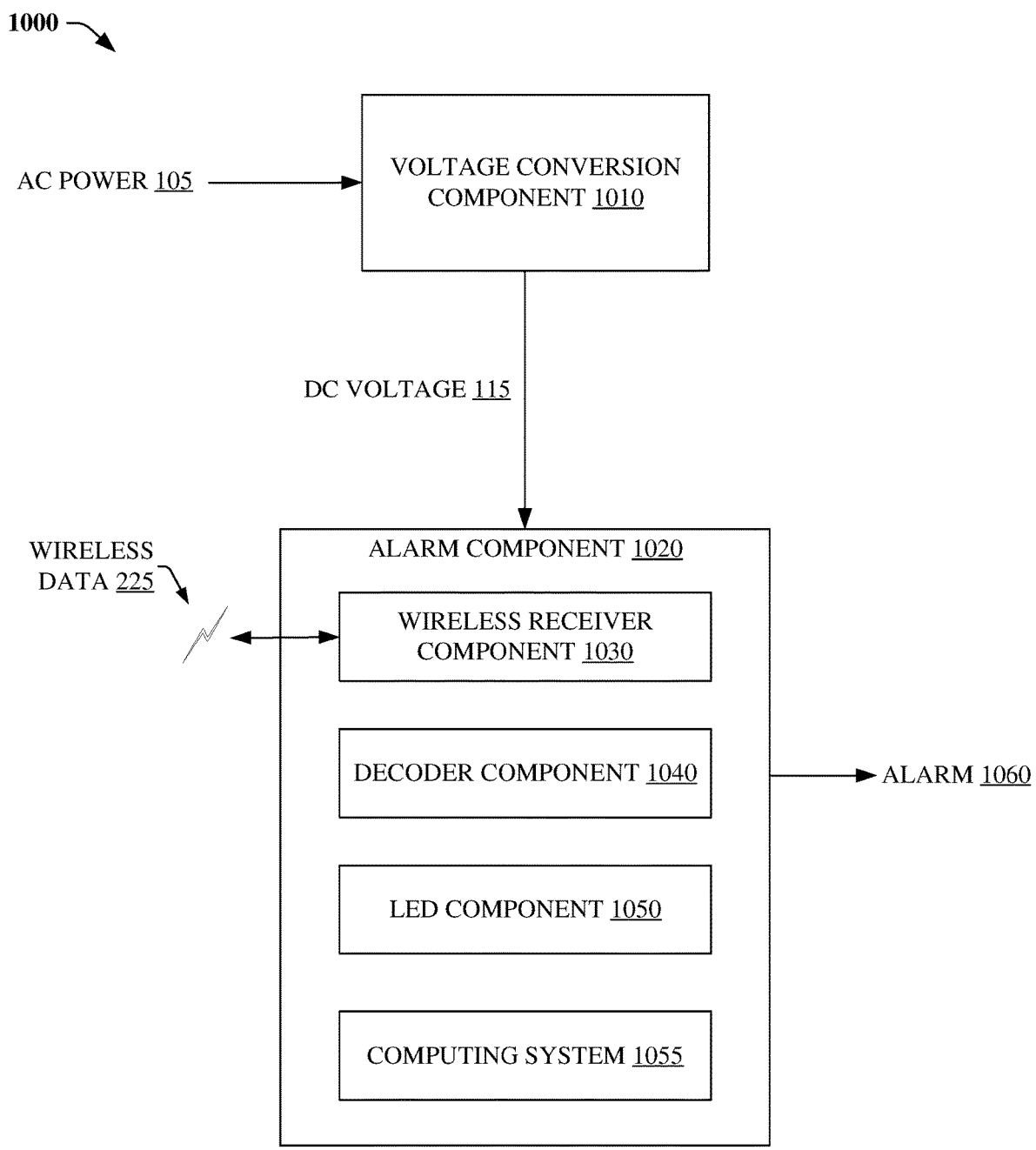
FIG. 10 illustrates a block diagram of an alarm system, in accordance with various example embodiments.

Referring now to FIG. 10, a block diagram of alarm system 1000, e.g., installed in an annunciation panel, is illustrated, in accordance with various example embodiments. Alarm system 1000 can include voltage conversion component 1010 and alarm component 1020. Voltage conversion component 1010 can receive AC power 105 that can include voltages from 85 to 305 VAC, e.g., via electrical wiring installed in a wall of a building. Further, voltage conversion component 1010 can generate DC voltage 115, e.g., 12 VDC, from AC power 105, e.g., an AC voltage that is higher in magnitude than the DC voltage.

Alarm component 1020 can wirelessly receive, via wireless receiver component 1030 (e.g., using DC voltage 115), an alarm signal, e.g., represented by, included within, etc. wireless data 225, from motion sensing component 120, e.g., from wall switch box 102, 210, 710, etc. within a wireless range, area, etc. of alarm component 1020, based on a motion detected by motion sensing component 120 of wall switch box 102, 210, 710, etc.

In one embodiment, alarm component 1020 can output, generate, etc. alarm 1060 in response to decoder component 1040 determining that the alarm signal satisfies a defined condition, e.g., with respect to being encrypted/decrypted according to a binary key, with respect to being encrypted/decrypted according to a communication protocol corresponding to transmission/reception of the alarm signal, etc.

For example, in an embodiment, the defined binary key can be manually set, programmed, etc. for security purposes via a pushbutton setup switch, e.g., representing 1 of $2^{24}$ possible key words, e.g., representing a keyword of the annunciation panel matching a wall switch box keyword that has been programmed via pushbutton setup switch(es) of respective wall switch box(es) wirelessly coupled to alarm component 1020. In other embodiment(s), the alarm signal can be encrypted, e.g., via communication protocol encryption component 230, e.g., based on an encryption strength of at least 128-bits (e.g., comprising at least $2^{128}$ possible combinations of encryption coding), according to a communication protocol, e.g., Z-Wave, ZigBee, Thread, WeMo, Bluetooth, Bluetooth Mesh, WiFi, etc. that has been utilized by a wireless transceiver of group of wireless transceivers 820 to transmit the alarm signal.

In another embodiment, alarm component 1020 can activate an LED (not shown) of LED component 1050 when alarm 1060 is output by alarm component 1020. In yet another embodiment, alarm component 1020 can activate another LED (not shown) of LED component 1050 when decoder 1040 determines that the alarm signal satisfies the defined condition, e.g., with respect to the binary key (e.g., based on a determination that the keyword of the annunciation panel matches a wall switch box keyword of a wall switch box wirelessly coupled to alarm component 1020); with respect to a determination that the alarm signal received by wireless receiver component 1030 is a valid carrier signal, e.g., representing the that the alarm signal has been determined to be encrypted/decrypted according to the communication protocol corresponding the transmission/reception of the alarm signal; etc.

Figure 11:
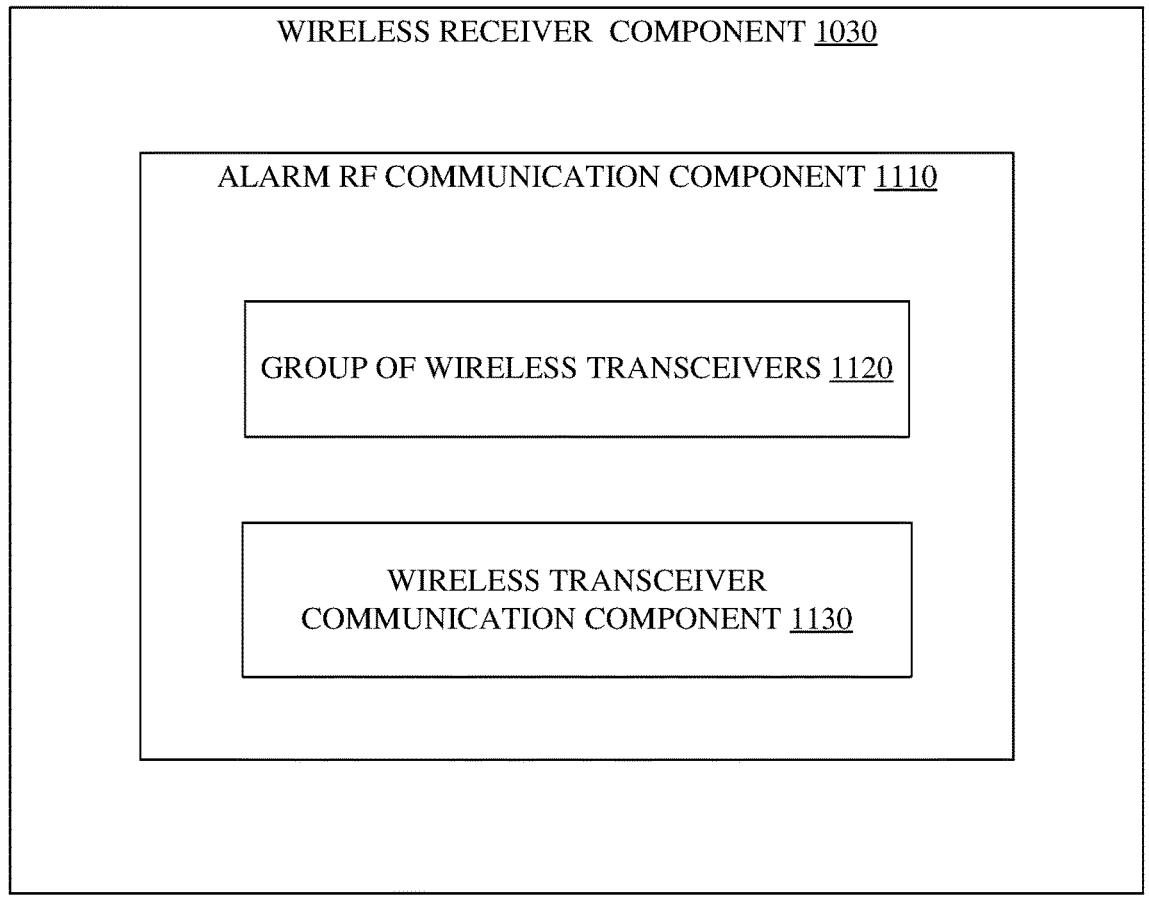
FIG. 11 illustrates a block diagram of a wireless receiver, in accordance with various example embodiments.

Now referring to FIG. 11, in accordance with various example embodiments, wireless receiver component 1030 can comprise alarm RF communication component 1110 to facilitate an expansion of wireless communication between alarm system 1000 and a wall switch box (e.g., 210, 710, etc.). Alarm RF communication component 1110 comprises group of wireless transceivers 1120 and wireless transceiver communication component 1130. Group of wireless transceivers 1120 can comprise wireless transceiver(s) (e.g., communication device(s), electronic chip set(s), etc.) (not shown) that can wirelessly communicate, via a computing device (not shown), information (e.g., wireless data 225) between alarm system 1000 and a wall switch box using respective communication protocols of the wireless transceiver(s), e.g., Z-Wave, ZigBee, Thread, WeMo, Bluetooth, Bluetooth Mesh, WiFi, based on a 900 MHz band (e.g., 902 MHz to 928 MHz), based on a 2.4 GHz frequency band, etc.

In embodiment(s), wireless transceiver communication component 1130 can facilitate, via respective SDKs corresponding to the wireless transceiver(s), programming (e.g., flash memory based programming) of defined capabilities, configurations, etc. of the wireless transceiver(s), e.g., during a manufacture of wireless receiver component 1030. In turn, alarm RF communication component 1110 can receive, e.g., via wireless data 225, control information for setting up, configuring, controlling, customizing, etc. features of the wireless transceiver(s) based on such programming.

For example, in an embodiment, alarm RF communication component 1110 can receive, e.g., via wireless data 225, the control information from an application of a client device (not shown) (e.g., a mobile device, a cellular phone, the alarm system, etc.), e.g., via a web-based interface, via respective APIs corresponding to the wireless transceiver(s), etc. Further, based on the control information, the computing device can select, configure, etc. a wireless transceiver of group of wireless transceivers 1120 to receive, transmit, etc. wireless data 225, e.g., to/from the wall switch box.

In this regard, the control information can specify a particular wireless receiver, transceiver, etc., and corresponding communication protocol, to be used by the alarm 1000 to receive the alarm signal from the wall switch box. For example, in embodiment(s), the control information can specify that alarm component 1020 select, e.g., via a computing system (1055): a 433 MHz receiver to receive the alarm signal (e.g., represented by wireless data 225), which has been encoded via an MS0001 encoder chip of the wall switch box; a wireless transceiver of group of wireless transceivers 1120 to receive the alarm signal according to an associated, specified, etc. communication protocol, e.g., Z-Wave, ZigBee, Thread, WeMo, Bluetooth, Bluetooth Mesh, WiFi, based on a 900 MHz band (e.g., 902 MHz to 928 MHz), based on a 2.4 GHz frequency band, etc.

Figure 12:
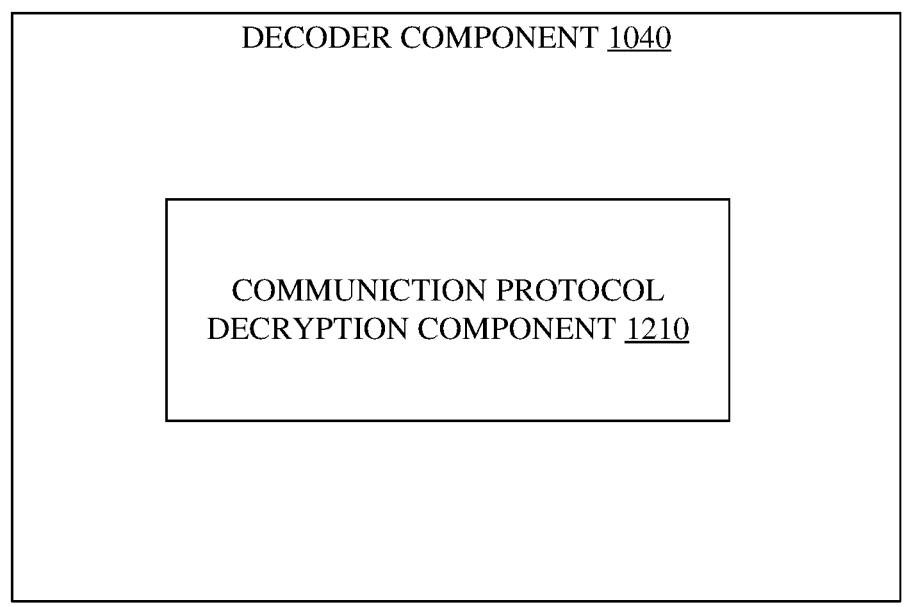
FIG. 12 illustrates a block diagram of a decoder component, in accordance with various example embodiments.

In turn, and now referring to FIG. 12, decoder component 1040 can comprise communication protocol decryption component 1210 that can decrypt, decode, etc., based on the control information, the alarm signal via the computing device according to the specified, the associated, etc. communication protocol of the wireless transceiver that has been selected based on the control information, in accordance with various example embodiments. In this regard, in embodiment(s), communication protocol decryption component 1210 can decrypt, decode, etc. the alarm signal based on a decryption, an encryption, etc. strength of at least 128-bits, e.g., as defined, utilized, etc. by a corresponding communication protocol, e.g., Z-Wave, ZigBee, Thread, WeMo, Bluetooth, Bluetooth Mesh, WiFi, based on a 900 MHz band (e.g., 902 MHz to 928 MHz), based on a 2.4 GHz frequency band, etc.

Figure 13:
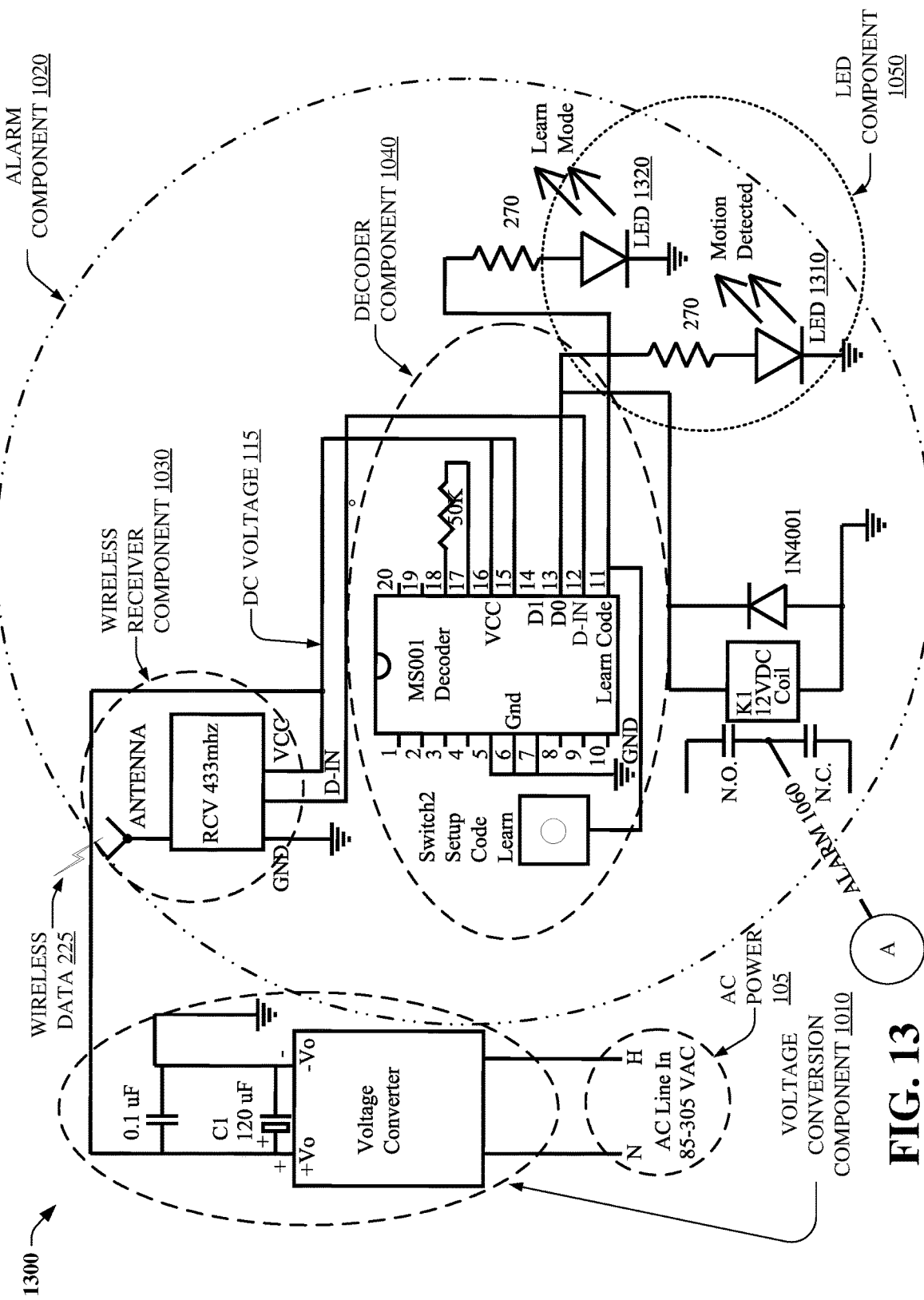
FIG. 13 illustrates an electrical schematic of an alarm system, in accordance with various example embodiments.

FIG. 13 illustrates an electrical schematic 1300 of alarm system 1000, in accordance with various example embodiments. As illustrated by FIG. 13, voltage conversion component 1010 can include an auto-switching voltage converter that automatically senses and converts voltages of AC Power 105, within a range of 85 to 305 VAC, to 12 VDC. In one or more embodiments, the auto-switching voltage converter meets one or more of the following specifications: 30 milliwatts (mW) max of no-load power consumption; high power conversion efficiency, e.g., up to 80%; isolated 3 kVAC output protection for 1 minute; short circuit protection; overvoltage protection; EN55022 and FCC Class B specifications; built-in fusible resistor. In this regard, voltage conversion component 1010 can generate DC voltage 115 while sourcing only a very small portion of power from AC power 105.

Further, wireless receiver component 1030 of alarm component 1020 can include a wireless receiver, e.g., a 433 MHz receiver module, which receives wireless data 225. In an embodiment, the 433 MHz receiver is rated to receive wireless data 225 transmitted from distance(s) up to 900 meters from alarm system 1000, depending on physical and RF signal interference. An MS001 decoder chip, e.g., manufactured by Linx Technologies™, can receive, at data input "D-IN", data from the 433 MHz receiver module corresponding to wireless data 225, and decode the data based on a binary combination, or key, of $2^{24}$ possible combinations set via pushbutton setup switch "Switch 2" that is attached to input pin 11 of the MS001 decoder chip. In this regard, the MS001 decoder chip activates, e.g., sets high, data output "D0" in response to the stored security keyword setting matching a security keyword setting of a remote wall switch box that transmitted wireless data 225 to alarm system 1000. Such addressing feature allows uniquely identified wireless RF signals to be configured for multiple zones, and for avoidance of conflicts with signals from other sources in nearby locations on a common carrier frequency. In one embodiment, the data received at data input "D-IN" can be verified, e.g., by computing system 1540 described below, three or more times to avoid false signal generation.

When data output "D0" is set high, or activated, LED 1310 is illuminated to indicate that a motion had been detected at a remote wall switch box. In one embodiment, LED 1320 is illuminated to indicate that a keyword learn mode has been activated on the MS001 decoder chip, e.g., that the decoder component 1040 is set to learn, e.g., store, etc. the security keyword setting of security component 220 of the remote wall switch box that transmitted wireless data 225. Further, when data output "D0" is set high, 12 VDC coil of relay K1 is activated, invoking either a "normally closed" or "normally open" type circuit activation of output signal alarm 1060.

Figure 14:
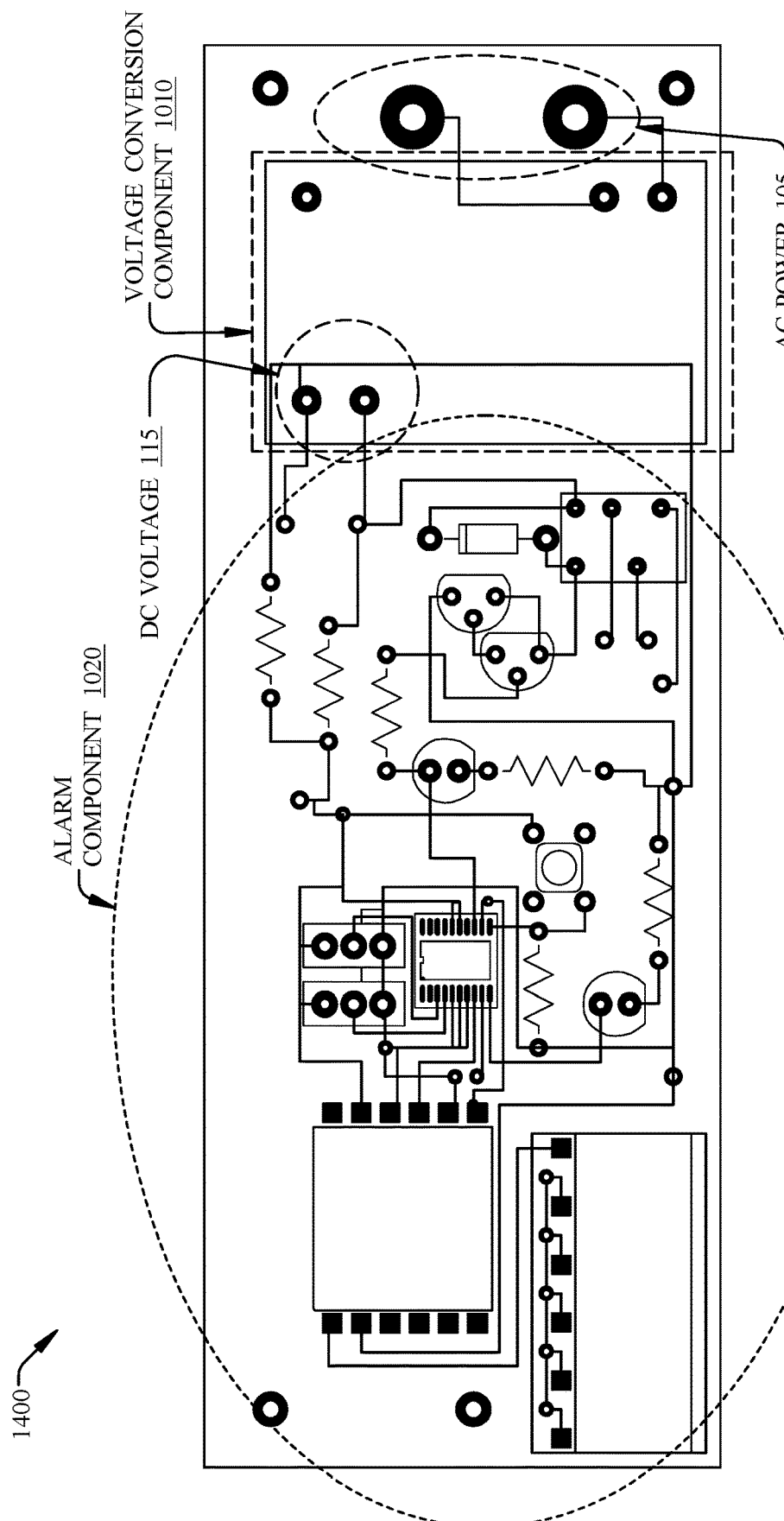
FIG. 14 illustrates a printed circuit board of an alarm system, in accordance with various example embodiments.

In an example embodiment illustrated by FIG. 14, components, circuit elements, devices, etc. of alarm system 1000, e.g., of electronic schematic 1300, are included in PCB 1400. In this regard, high-voltage AC circuitry, e.g., AC Power 105 and voltage conversion component 1010, and switching component(s), e.g., corresponding to output signal alarm 1060, are separated from low-voltage DC electronics, e.g., corresponding to decoder component 1040, within a single PCB.

Figure 15:
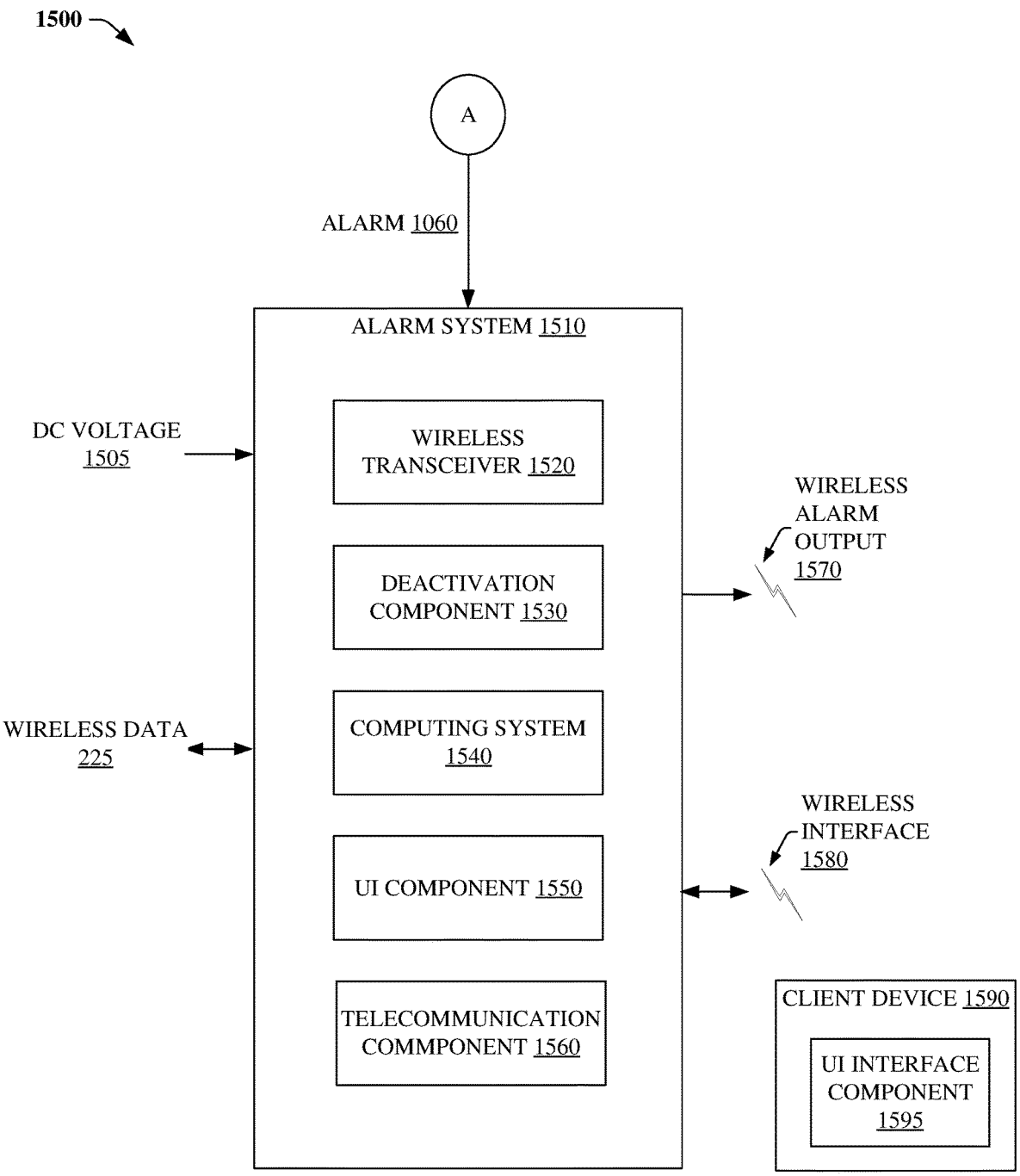
FIG. 15 illustrates a block diagram of another alarm system, in accordance with various example embodiments.
Figure 16:
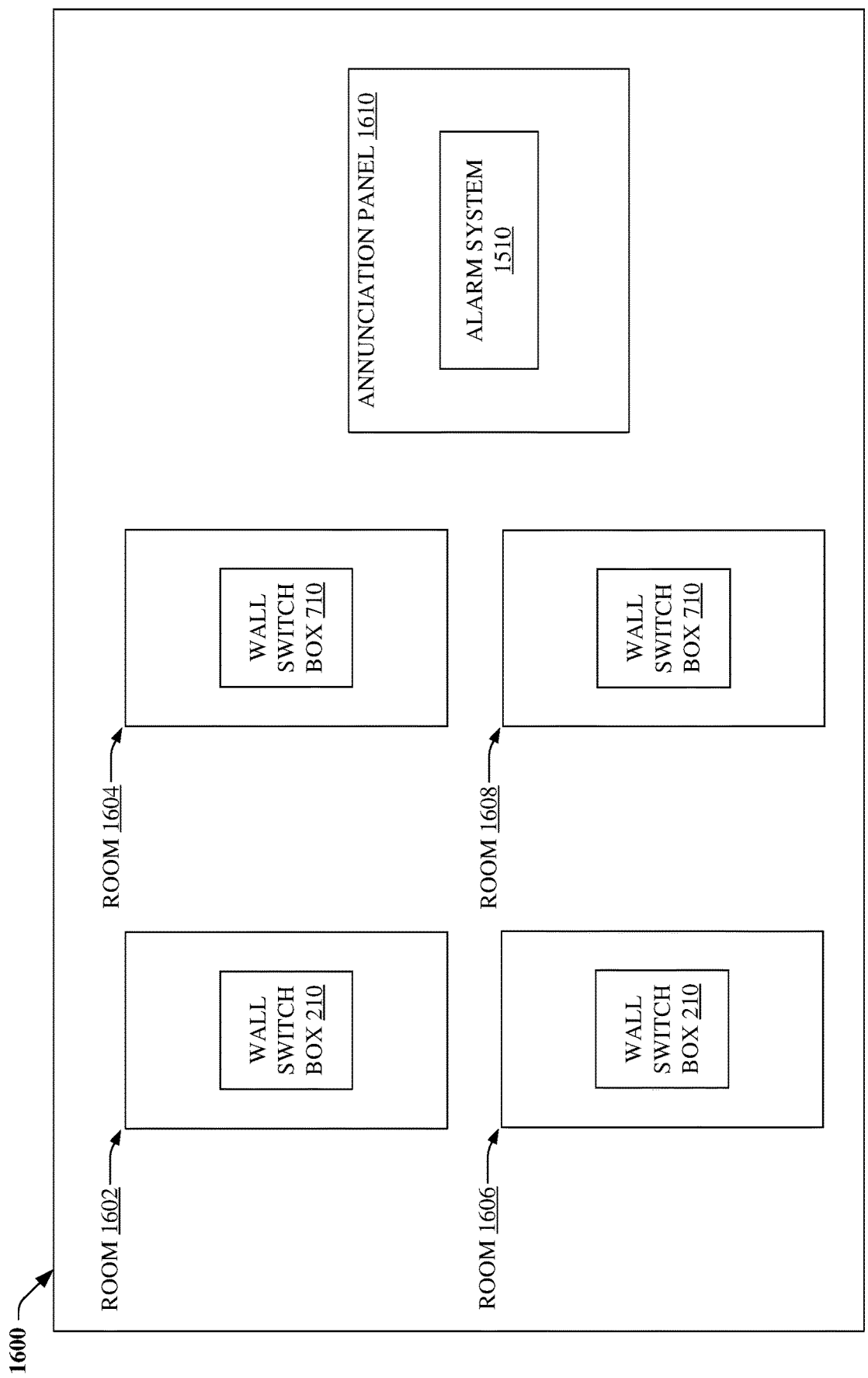
FIG. 16 illustrates a block diagram of a building including an alarm system, in accordance with various example embodiments.

FIG. 15 illustrates a block diagram of another alarm system (1510), in accordance with various example embodiments. Components, devices, etc. of alarm system 1510, e.g., an annunciation panel, are powered by DC voltage 1505, e.g., 12 VDC generated by a voltage conversion component (not shown). Computing system 1540, e.g., an embedded microcontroller/microprocessor based system, etc. can be configured to receive an input, e.g., via UI component 1550, e.g., a keyboard, keypad, voice activated system, etc. from an operator, homeowner, business owner, etc. of alarm system 1510 for controlling operation of alarm system 1510. Further, UI component 1550 can include one or more displays, monitors, speakers, etc. that display video, emit audio, etc. information corresponding to detected motion data received, e.g., received from wall switch boxes (e.g., 210, 710, etc.) of building 1600 illustrated by FIG. 16. In this regard, alarm system 1510 can be included in annunciation panel 1610, e.g., an alarm panel, a smarthub based home, building, etc. automation/control device, etc. of building 1600, which can be wirelessly coupled to wall switch boxes (e.g., 210, 710) located in rooms 1602, 1604, 1606, and 1608, respectively, to send/receive wireless data 225.

In another embodiment, computing system 1540 can be configured to transmit, based on the input, wireless alarm output 1570 in response to a determination that a motion had been detected at a remote wall switch, e.g., based on alarm 1060, based on wireless data 225 representing the alarm signal, etc. In embodiment(s), wireless alarm output 1570 can be transmitted, broadcast, etc. via cellular, WiFi, Z-Wave, ZigBee, Thread, WeMo, Bluetooth, Bluetooth Mesh, WiFi, etc. based technologies via authenticated Internet, web, smart phone, etc. based applications. In this regard, the operator, homeowner, business owner, etc. can remotely control lighting of building 1600, and remotely monitor motion alarm(s), video, audio, etc. of alarm system 1510. In one embodiment, wireless alarm output 1570 can include audio and/or video information that was received in wireless data 225.

In another embodiment, the operator, homeowner, business owner, etc. can remotely control, via wireless transceiver 1520, lighting of building 1600 by deactivating, via deactivation component 1530, wireless alarm output 1570, e.g., if the operator deems the motion to be caused by a pet, a known occupant of building 1600, etc.

In yet another embodiment, the annunciation panel can utilize telecommunications component 1560 to call, dial, etc. a predetermined phone number, e.g., cell phone number, emergency contact number, 9-1-1, etc. in response to activation of alarm 1060, based on wireless data 225 representing the alarm signal, etc., e.g., to alert authorities of a trespass. In one embodiment, telecommunications component 1560 can include a telecom interface coupled to a wired telecommunication line, cable, etc. to call, dial, etc. the predetermined phone number. In another embodiment, telecommunications component 1560 an include a cellular interface to call, dial, etc. the predetermined phone number.

In embodiment(s), an application, a web-based application, etc. (application 1595) of client device 1590, e.g., a mobile device, an Internet connected device, etc. can send/receive information (e.g., control information described above) to/from UI component 1550 of alarm system 1510 via wireless interface 1580, e.g., a Z-Wave, a ZigBee, a Thread, a WeMo, a Bluetooth, a Bluetooth Mesh, a WiFi, a 900 MHz band (e.g., 902 MHz to 928 MHz), a 2.4 GHz frequency band, etc. based interface. In this regard, the information can be used to setup, configure, control, manage, etc. component(s) (e.g., transceiver(s)), operation(s), etc. (e.g., as described above) of alarm system 1510.

In other embodiment(s), the application, web-based application, etc. can send/receive information (e.g., control information described above) to/from a wall switch box (e.g., 210, 710) via wireless interface 1580, via wireless data 225 (e.g., via wireless transceiver(s) of client device 1590), etc. to setup, configure, control, manage, etc. component(s), operation(s), etc. (e.g., as described above) of the wall switch box. In this regard, the application, web-based application, etc. can be used to send control information specifying the particular wireless receiver, transceiver, etc. and corresponding communication protocol to be used by the wall switch box to transmit, broadcast, etc. the alarm signal.

In yet other embodiment(s), the application, the web-based application, etc. can perform one or more of the following operations(s): identify, e.g., by distinct identifier, name, etc. respective wall switch boxes that have been installed in a location, building (e.g., 1600), etc.; configure arming/enabling, disarming/disabling, etc. an alarm signal of a wall switch box, e.g., based on an instruction received from an operator of client device 1590, based on a defined schedule, based on a determined proximity of client device 1590 to the wall switch box (e.g., disarm/disable the alarm signal in response to establishing a communication, near-field communication, etc. with client device 1590—the establishing of the communication representing client device 1590 is within a close proximity of the wall switch box); receive notification of detected event(s), e.g., an activation of the alarm signal; review audio and/or video information that has been recorded, e.g., via camera 720, microphone 730, computing system 740, etc. by the wall switch box, e.g., based on the activation of the alarm signal; cancel, suspend, etc. an alert directed (e.g., via telecommunications component 1560) to authorities, a predetermined phone number (e.g., 9-1-1), etc.

Figure 17:
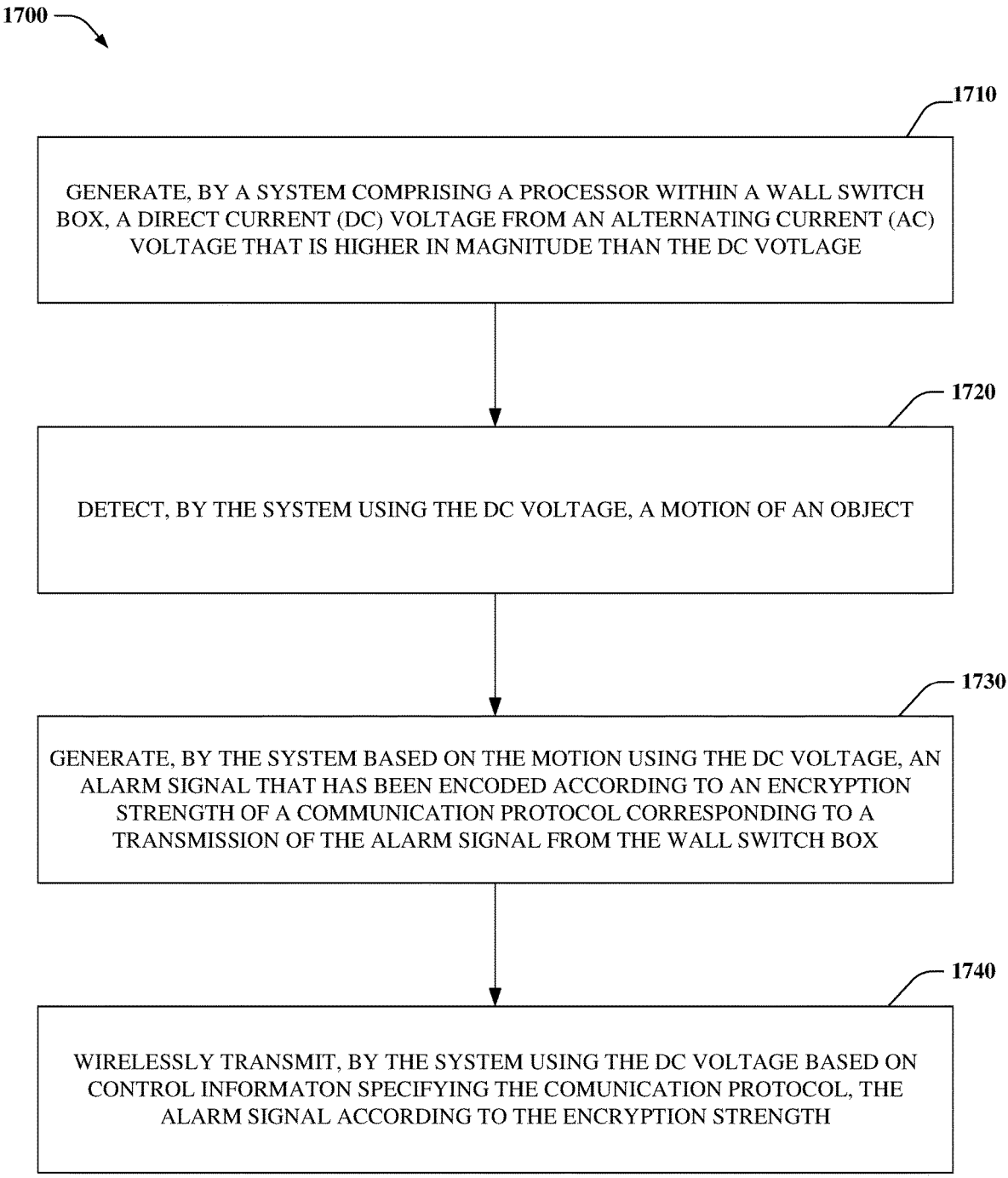
FIG. 17 illustrates a flow diagram of a method associated with a wall switch box, in accordance with various example embodiments.
Figure 18:
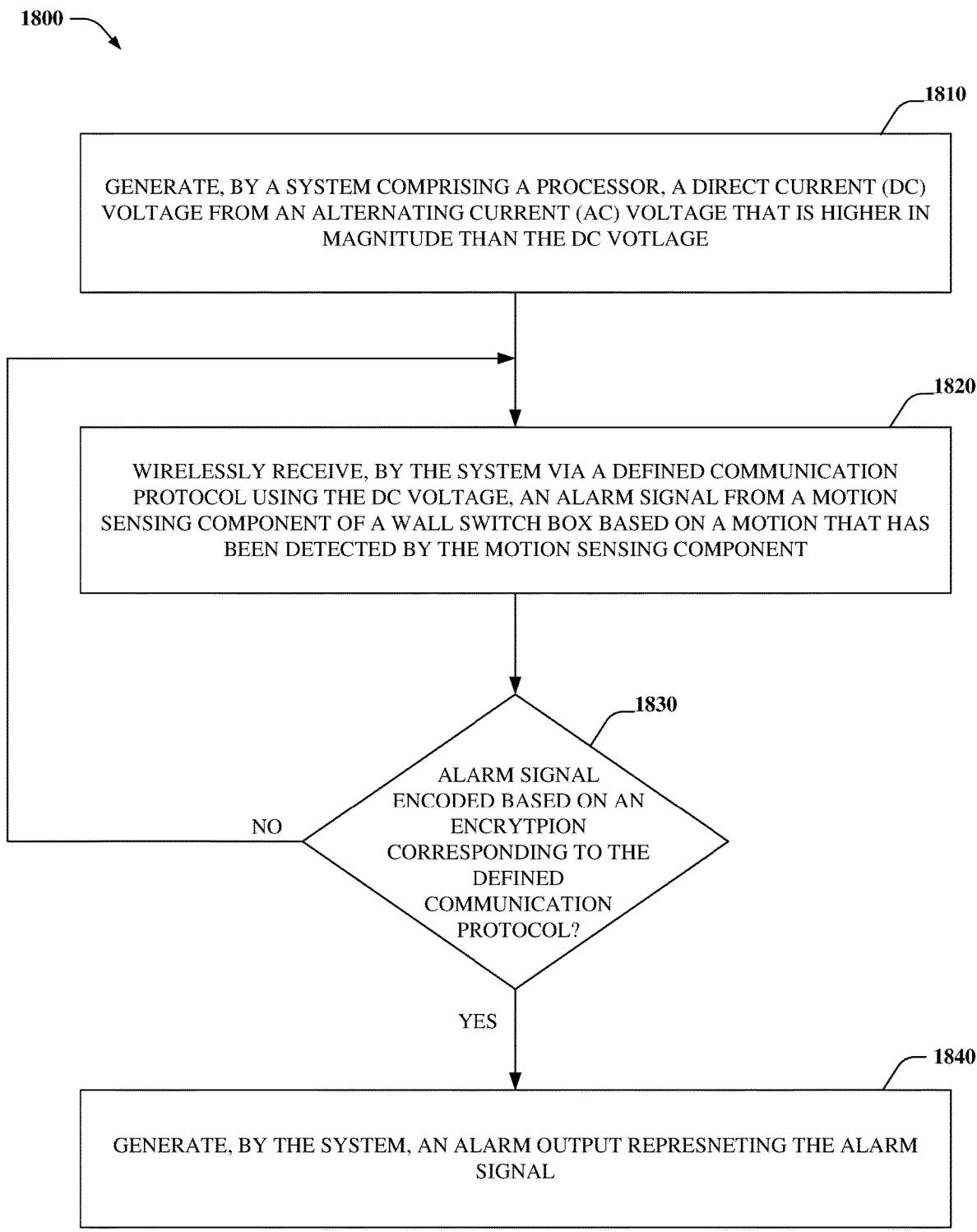
FIG. 18 illustrates a flow diagram of a method associated with an alarm system, in accordance with various example embodiments.

FIGS. 17-18 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 17, a flow diagram (1700) of a method associated with a wall switch box (e.g., 710) is illustrated, in accordance with various example embodiments. At 1710, a DC voltage can be generated, by a system (e.g., 740 via voltage conversion component 110), from an AC voltage that is higher in magnitude than the DC voltage. At 1720, the system can detect, using the DC voltage (e.g., via motion sensing component 120), a motion of an object. At 1730, the system can generate, based on the motion using the DC voltage, an alarm signal that has been encoded (e.g., via 740) according to an encryption strength of a communication protocol corresponding to a transmission of the alarm signal from the wall switch box. At 1740, the system can wirelessly transmit, using the DC voltage based on the control information specifying the communication protocol, the alarm signal according to the encryption strength.

FIG. 18 illustrates a flow diagram (1800) of a method associated with an alarm system (e.g. 1000, 1500), in accordance with various example embodiments. At 1810, a system (e.g., 1055 via a voltage conversion device) can generate a DC voltage from an AC voltage that is higher in magnitude than the DC voltage. At 1820, the system can wirelessly receive, via a defined communication protocol using the DC voltage, an alarm signal from a motion sensing component of a wall switch box (e.g., 210, 710) based on a motion that has been detected by the motion sensing component. At 1830, it can be determined whether the alarm signal has been encoded based on an encryption corresponding to the defined communication protocol.

In this regard, if it has been determined that the alarm signal has been encoded based on the encryption corresponding to the defined communication protocol, flow continues to 1840, at which the system can generate an alarm output representing the alarm signal; otherwise flow returns to 1820.

It should be appreciated that embodiments of devices, circuits, components, etc. described herein can be grounded via electrical ground wires and/or fully enclosed in plastic enclosures to provide circuit protection and isolation. Further, such embodiments can include backup battery components that power motion sensing components and functions during power failures. Furthermore, in other embodiments, conventional light fixture dimming controls, functionality, etc. can be included in the devices, circuits, components, etc. described herein to provide for dimmable lighting.

As it employed in the subject specification, the terms "processor", "embedded processor", "microcontroller", "embedded microcontroller", "microprocessor", "embedded microprocessor", "computing system" and the like can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, memory device(s), memory component(s), or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units. Further, it will be appreciated that the memory components described herein can be either volatile memory or nonvolatile memory, or can include both volatile and nonvolatile memory.

Figure 19:
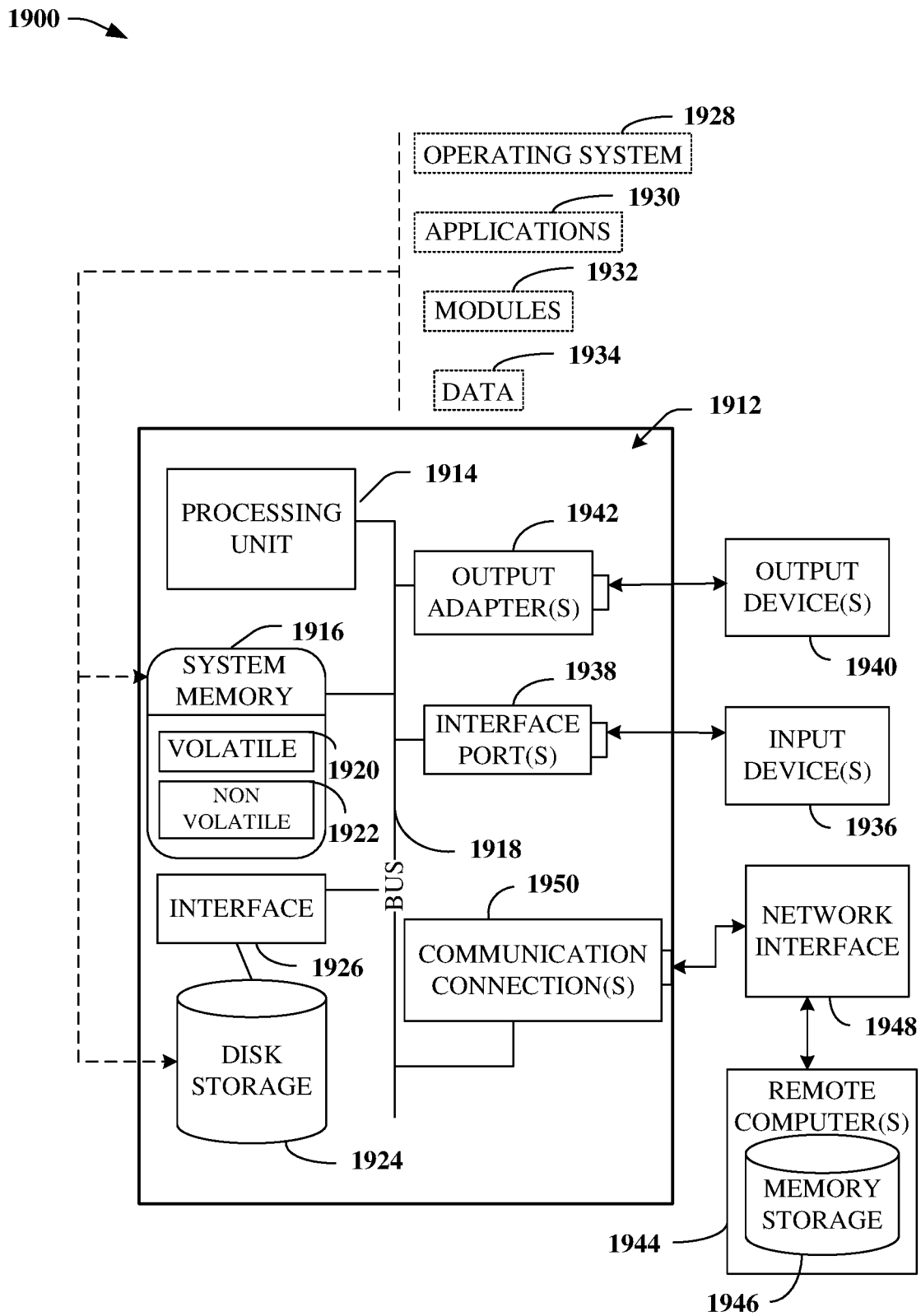
FIG. 19 illustrates a block diagram of a computing system, in accordance with various example embodiments.

In order to provide a context for the various aspects of the disclosed subject matter, FIG. 19, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, handheld computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 19, a block diagram of a computing system 1900 operable to execute the disclosed systems, e.g., alarm system 1110, computing system 1140, etc. is illustrated, in accordance with various example embodiments. Computer 1912 includes a processing unit 1914, a system memory 1916, and a system bus 1918. System bus 1918 couples system components including, but not limited to, system memory 1916 to processing unit 1914. Processing unit 1914 can be any of various available processors. Dual microprocessors and other multiprocessor architectures also can be employed as processing unit 1914.

System bus 1918 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI), and/or controller area network (CAN) bus used in vehicles.

System memory 1916 includes volatile memory 1920 and nonvolatile memory 1922. A basic input/output system (BIOS), containing routines to transfer information between elements within computer 1912, such as during start-up, can be stored in nonvolatile memory 1922. By way of illustration, and not limitation, nonvolatile memory 1922 can include ROM, PROM, EPROM, EEPROM, or flash memory. Volatile memory 1920 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1912 also includes removable/non-removable, volatile/non-volatile computer storage media. FIG. 19 illustrates, for example, disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1924 to system bus 1918, a removable or non-removable interface is typically used, such as interface 1926.

It is to be appreciated that FIG. 19 describes software that acts as an intermediary between users and computer resources described in suitable operating environment 1900. Such software includes an operating system 1928. Operating system 1928, which can be stored on disk storage 1924, acts to control and allocate resources of computer system 1912. System applications 1930 take advantage of the management of resources by operating system 1928 through program modules 1932 and program data 1934 stored either in system memory 1916 or on disk storage 1924. It is to be appreciated that the disclosed subject matter can be implemented with various operating systems or combinations of operating systems.

A user can enter commands or information into computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1914 through system bus 1918 via interface port(s) 1938. Interface port(s) 1938 include, for example, a serial port, a parallel port, a game port, a universal serial bus (USB), a wireless based port, e.g., WiFi, Bluetooth®, etc. Output device(s) 1940 use some of the same type of ports as input device(s) 1936.

Thus, for example, a USB port can be used to provide input to computer 1912 and to output information from computer 1912 to an output device 1940. Output adapter 1942 is provided to illustrate that there are some output devices 1940, like display devices, light projection devices, monitors, speakers, and printers, among other output devices 1940, which use special adapters. Output adapters 1942 include, by way of illustration and not limitation, video and sound devices, cards, etc. that provide means of connection between output device 1940 and system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. Remote computer(s) 1944 can be a personal computer, a server, a router, a network PC, a workstation, a microprocessor based appliance, a peer device, or other common network node and the like, and typically includes many or all of the elements described relative to computer 1912.

For purposes of brevity, only a memory storage device 1946 is illustrated with remote computer(s) 1944. Remote computer(s) 1944 is logically connected to computer 1912 through a network interface 1948 and then physically and/or wirelessly connected via communication connection 1950. Network interface 1948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1950 refer(s) to hardware/software employed to connect network interface 1948 to bus 1918. While communication connection 1950 is shown for illustrative clarity inside computer 1912, it can also be external to computer 1912. The hardware/software for connection to network interface 1948 can include, for example, internal and external technologies such as modems, including regular telephone grade modems, cable modems and DSL modems, wireless modems, ISDN adapters, and Ethernet cards.

The computer 1912 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1912 can connect to other devices/networks by way of antenna, port, network interface adaptor, wireless access point, modem, and/or the like.

The computer 1912 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least WiFi and Bluetooth® wireless technologies, Z-Wave, ZigBee, Thread, WeMo, Bluetooth, Bluetooth Mesh, etc., e.g., using a 900 MHz band (e.g., 902 MHz to 928 MHz), 2.4 GHz frequency, etc.

Thus, the communication can be a predefined structure as with a conventional network or simply an ad hoc communication between at least two devices.

WiFi allows connection to the Internet from a desired location (e.g., a vehicle, couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the term "component" is intended to refer to a device, a circuit element, an electrical component, a group of devices, a group of circuit elements, and/or a group of electrical components. As another example, a component can be an apparatus with specific functionality provided by mechanical parts operated by electric or electronic circuitry; the electric or electronic circuitry can be operated by a software application or a firmware application executed by one or more processors, e.g., via memory device(s); the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary"

and/or "demonstrative" is not necessarily to be construed as preferred or advantageous over other aspects or designs, nor is it meant to preclude equivalent exemplary structures and techniques known to those of ordinary skill in the art.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A wall switch box, comprising:
a voltage conversion component that generates a direct current (DC) voltage from an alternating current (AC) voltage that is higher in magnitude than the DC voltage;
a motion sensing component that uses the DC voltage to detect a motion of an object; and
based on the motion, a security component that generates, using the DC voltage, an alarm signal that has been encoded according to an encryption strength of a communication protocol corresponding to a transmission of the alarm signal from the wall switch box.

2. The wall switch box of claim 1, further comprising:
a communication expansion component that wirelessly transmits, using the DC voltage based on control information specifying the communication protocol, the alarm signal according to the encryption strength.

3. The wall switch box of claim 2, wherein the encryption strength corresponds to at least $2^{128}$ combinations.

4. The wall switch box of claim 2, wherein the communication protocol comprises Z-Wave, ZigBee, Thread, WeMo, Bluetooth, Bluetooth Mesh, or WiFi.

5. The wall switch box of claim 2, wherein the communication protocol corresponds to a 433 MHz frequency band, a 900 MHz frequency band, or a 2.4 GHz frequency band.

6. The wall switch box of claim 2, wherein the communication protocol corresponds to a binary key that has been manually programmed via a user interface of the wall switch box.

7. The wall switch box of claim 6, wherein the encryption strength corresponds to at least $2^{24}$ combinations.

8. The wall switch box of claim 1, further comprising:
a power component that switches, from the wall switch box using the DC voltage based on the motion, the AC voltage from a first contact to a second contact.

9. The wall switch box of claim 8, wherein the second contact is electrically coupled to a light fixture.

10. The wall switch box of claim 8, wherein the power component switches the AC voltage from the first contact to the second contact based on a detected contact of a switch electrically coupled to the DC voltage.

11. The wall switch box of claim 1, wherein the motion sensing component detects the motion using at least one of an infrared sensor or an ultrasonic based sensor.

12. The wall switch box of claim 2, further comprising:
a video camera that generates, using the DC voltage, data based on the motion, wherein the communication expansion component wirelessly transmits, using the DC voltage, the data from the wall switch box.

13. The wall switch box of claim 2, further comprising:
a microphone that generates, using the DC voltage, data based on the motion, wherein the communication expansion component wirelessly transmits, using the DC voltage, the data from the wall switch box.

14. The wall switch box of claim 1, further comprising an application programming interface integration component that:
receives, via a smarthub based interface, control information, and
based on the control information, at least one of:
sends a distinct identifier representing the wall switch box,
arms or disarms the alarm signal,
records at least one of audio information, video information, or environmental information that has been generated by the wall switch box,
controls a notification corresponding to the alarm signal that has been directed to an alarm service device, or
controls a device within a building comprising the wall switch box.

15. A wall switch device, comprising:
a switch that is electrically coupled to a direct current (DC) voltage and activates, using the DC voltage based on a detected contact of the switch, a relay within the wall switch device that switches an alternating current (AC) voltage from a first contact to a second contact, wherein the DC voltage has been generated by the AC voltage within the wall switch device, and wherein a first magnitude of the AC voltage is greater than a second magnitude of the DC voltage;
an opening corresponding to a portion of a motion sensing component that detects, from the wall switch device using the DC voltage, a motion of an object;
a security component that generates, based on the motion using the DC voltage, an alarm signal; and
an encoder component that encodes, using the DC voltage, the alarm signal based on an encryption corresponding to a communication protocol used to wirelessly communicate the alarm signal to a remote device.

16. The wall switch device of claim 15, wherein the communication protocol corresponds to Z-Wave, ZigBee, Thread, WeMo, Bluetooth, Bluetooth Mesh, WiFi, a 433 MHz frequency band, a 900 MHz frequency band, or a 2.4 GHz frequency band.

17. The wall switch device of claim 15, wherein the encoder component encodes the alarm signal via an interface of the wall switch device based on a defined binary key.

18. An alarm system, comprising:
a voltage conversion component that generates a direct current (DC) voltage from an alternating current (AC) voltage that is higher in magnitude than the DC voltage; and
an alarm component that:
wirelessly receives, via a defined communication protocol using the DC voltage, an alarm signal from a motion sensing component of a wall switch box based on a motion that has been detected by the motion sensing component; and in response to a determination that the alarm signal has been encoded according to an encryption corresponding to the defined communication protocol, generates an alarm output representing the alarm signal.

19. The alarm system of claim 18, further comprising:
a wireless transceiver that wirelessly transmits, via the defined communication protocol using the DC voltage, data based on the alarm output.

20. The alarm system of claim 18, wherein the defined communication protocol comprises Z-Wave, ZigBee, Thread, WeMo, Bluetooth, Bluetooth Mesh, WiFi, a 433 MHz frequency band, a 900 MHz frequency band, or a 2.4 GHz frequency band.

* * * * *